(12) United States Patent
Saikusa et al.

(10) Patent No.: US 10,508,848 B2
(45) Date of Patent: Dec. 17, 2019

(54) REFRIGERATION CYCLE APPARATUS

(71) Applicants: Mitsubishi Electric Corporation, Tokyo (JP); AGC INC., Tokyo (JP)

(72) Inventors: Tetsuji Saikusa, Tokyo (JP); Takeshi Sugimoto, Tokyo (JP)

(73) Assignees: Mitsubishi Electric Corporation, Tokyo (JP); AGC INC., Tokyo (JP)

( * ) Notice: Subject to any disclaimer, the term of this patent is extended or adjusted under 35 U.S.C. 154(b) by 348 days.

(21) Appl. No.: 15/108,339

(22) PCT Filed: Mar. 14, 2014

(86) PCT No.: PCT/JP2014/056981
§ 371 (c)(1),
(2) Date: Jun. 27, 2016

(87) PCT Pub. No.: WO2015/136703
PCT Pub. Date: Sep. 17, 2015

(65) Prior Publication Data
US 2016/0320111 A1    Nov. 3, 2016

(51) Int. Cl.
*F25B 40/00* (2006.01)
*F25B 49/02* (2006.01)
(Continued)

(52) U.S. Cl.
CPC .............. *F25B 49/02* (2013.01); *F25B 13/00* (2013.01); *F25B 41/062* (2013.01); *F25B 43/006* (2013.01); *F25B 49/022* (2013.01); *F25B 40/00* (2013.01); *F25B 2313/003* (2013.01); *F25B 2313/02741* (2013.01); *F25B 2341/0661* (2013.01); *F25B 2341/0662* (2013.01); *F25B 2400/054* (2013.01); *F25B 2500/06* (2013.01); *F25B 2500/19* (2013.01); *F25B 2600/2509* (2013.01); *F25B 2600/2513* (2013.01); *F25B 2700/195* (2013.01);
(Continued)

(58) Field of Classification Search
CPC ................... F25B 43/006; F25B 40/00; F25B 2700/21163; F25B 2500/06; F25B 2700/21152; F25B 2400/051
See application file for complete search history.

(56) References Cited

U.S. PATENT DOCUMENTS

| 6,058,727 A | 5/2000 | Fraser, Jr. et al. |
| 10,001,309 B2 * | 6/2018 | Tanaka ................... F25B 45/00 |

(Continued)

FOREIGN PATENT DOCUMENTS

| CN | 1247598 A | 3/2000 |
| CN | 102066851 A | 5/2011 |

(Continued)

OTHER PUBLICATIONS

JP2008128493 translation.*
(Continued)

*Primary Examiner* — Nelson J Nieves
(74) *Attorney, Agent, or Firm* — Posz Law Group, PLC

(57) ABSTRACT

A refrigeration cycle apparatus using refrigerant including HFO-1123, the refrigeration cycle apparatus including a compressor, a condenser, an expansion valve, and an evaporator connected in a loop, and a cooling unit configured to cool the refrigerant at an inlet of the expansion valve.

11 Claims, 16 Drawing Sheets

(51) Int. Cl.
  *F25B 13/00* (2006.01)
  *F25B 41/06* (2006.01)
  *F25B 43/00* (2006.01)

(52) U.S. Cl.
  CPC ............ *F25B 2700/1931* (2013.01); *F25B 2700/2103* (2013.01); *F25B 2700/21152* (2013.01); *F25B 2700/21163* (2013.01)

(56) References Cited

U.S. PATENT DOCUMENTS

| | | | |
|---|---|---|---|
| 2001/0037649 A1 | 11/2001 | Fujitaka et al. | |
| 2005/0284169 A1* | 12/2005 | Tamura | F25B 25/00 62/324.1 |
| 2009/0199581 A1* | 8/2009 | Ushijima | F25B 30/02 62/238.7 |
| 2009/0272135 A1* | 11/2009 | Nishimura | F25B 13/00 62/149 |
| 2011/0023535 A1* | 2/2011 | Morimoto | C09K 5/045 62/510 |
| 2011/0083456 A1 | 4/2011 | Wakamoto et al. | |
| 2011/0100042 A1* | 5/2011 | Yamashita | C09K 5/045 62/228.1 |
| 2012/0021247 A1* | 1/2012 | Komatsu | C09K 5/045 428/646 |
| 2012/0117993 A1* | 5/2012 | Takahashi | B60H 1/00907 62/132 |
| 2013/0098101 A1* | 4/2013 | Ishida | C09K 5/045 62/468 |
| 2014/0069140 A1* | 3/2014 | Kim | F25B 40/00 62/513 |
| 2014/0070132 A1 | 3/2014 | Fukushima | |
| 2014/0077123 A1* | 3/2014 | Fukushima | C09K 5/044 252/67 |
| 2015/0008359 A1* | 1/2015 | Matsumoto | C09K 5/045 252/68 |

FOREIGN PATENT DOCUMENTS

| | | | | |
|---|---|---|---|---|
| CN | 103562338 A | 2/2014 | | |
| JP | H10-068553 A | 3/1998 | | |
| JP | H10-141798 A | 5/1998 | | |
| JP | 2002-107074 A | 4/2002 | | |
| JP | 2002-139261 A | 5/2002 | | |
| JP | 2002-277078 A | 9/2002 | | |
| JP | 2004-286266 A | 10/2004 | | |
| JP | 2005-221229 A | 8/2005 | | |
| JP | 2008-128493 A | 6/2008 | | |
| JP | 2008-215697 A | 9/2008 | | |
| JP | 2009-180429 A | 8/2009 | | |
| JP | 2010-007975 A | 1/2010 | | |
| JP | 2011-080634 A | 4/2011 | | |
| JP | 2011-099626 A | 5/2011 | | |
| WO | 2009/150761 A1 | 12/2009 | | |
| WO | 2009/157320 A1 | 12/2009 | | |
| WO | 2012/157764 A1 | 11/2012 | | |
| WO | WO-2012157765 A1 * | 11/2012 | ............ | C09K 5/044 |
| WO | 2013/080244 A1 | 6/2013 | | |

OTHER PUBLICATIONS

Invitation pursuant to Rule 62a(1) EPC issued Sep. 26, 2017 in corresponding EP patent application No. 12885148.8.
Japanese Office Action dated May 9, 2017 for the corresponding JP application No. 2016-507239 (English translation attached).
International Search Report of the International Searching Authority dated Jun. 10, 2014 for the corresponding international application No. PCT/JP2014/056981 (and English translation).
Extended European Search Report dated Jan. 5, 2018 issued in corresponding EP patent application No. 14885148.8.
Office action dated Aug. 23, 2018 issued in corresponding CN patent application No. 201480072637.X (and English translation thereof).

* cited by examiner

REFRIGERATION CYCLE APPARATUS

CROSS REFERENCE TO RELATED APPLICATION

This application is a U.S. national stage application of PCT/JP2014/056981 filed on Mar. 14, 2014, the contents of which are incorporated herein by reference.

TECHNICAL FIELD

The present invention relates to a refrigeration cycle apparatus as typified by a heat pump water heater.

BACKGROUND ART

As a related-art refrigeration cycle apparatus, for example, there is proposed a refrigeration cycle apparatus, "in which a working medium including HFO-1123 is used, and which generally comprises a compressor to compress a working medium vapor A to form a high temperature/high pressure working medium vapor B, a condenser to cool and liquefy the working medium vapor B discharged from the compressor to form a low temperature/high pressure working medium C, an expansion valve to let the working medium C discharged from the condenser expand to form a low temperature/low pressure working medium D, an evaporator to heat the working medium D discharged from the expansion valve to form a high temperature/low pressure working medium vapor A, a pump to supply a load fluid E to the evaporator, and a pump to supply a fluid F to the condenser" (see, for example, Patent Literature 1).

CITATION LIST

Patent Literature

Patent Literature 1: International Patent WO 2012/157764 A1 (Page 12, Page 13, and FIG. 1)

SUMMARY OF INVENTION

Technical Problem

In the refrigeration cycle apparatus disclosed in Patent Literature 1, refrigerant having low global warming potential, including HFO-1123, is used, but a chemical reaction involving heat generation may proceed in HFO-1123 due to a reaction called "disproportionation reaction" when energy is input under a high-temperature and high-pressure state, thereby causing abrupt pressure increase along with abrupt temperature increase. As a result, there is a possibility of dangers such as explosions.

The present invention has been made to solve the problem as described above, and therefore has a first object to provide a refrigeration cycle apparatus that operates safely by suppressing disproportionation reaction of HFO-1123.

The present invention has a second object to provide a refrigeration cycle apparatus capable of suppressing influence on the global environment with HFO-1123 having low global warming potential, which is applied to a refrigeration cycle.

Solution to Problem

According to the present invention, there is provided a refrigeration cycle apparatus using refrigerant including HFO-1123, the refrigeration cycle apparatus including: a compressor, a condenser, an expansion valve, and an evaporator connected in a loop; and a cooling unit configured to cool the refrigerant at an inlet of the expansion valve.

Advantageous Effects of Invention

In the refrigeration cycle apparatus of the present invention, including the compressor, the condenser, the expansion valve, and the evaporator connected in a loop and using the refrigerant including HFO-1123, the cooling unit configured to cool the refrigerant at the inlet of the expansion valve is provided, and hence the temperature of the high-pressure liquid refrigerant can be lowered, thereby attaining an effect of suppressing the disproportionation reaction.

BRIEF DESCRIPTION OF DRAWINGS

FIG. 1A is an enlarged cross-sectional view of portion 1A of FIG. 1.

FIG. 1B is an enlarged cross-sectional view of portion 1B of FIG. 1.

DESCRIPTION OF EMBODIMENTS

Embodiment 1

Figure 1:
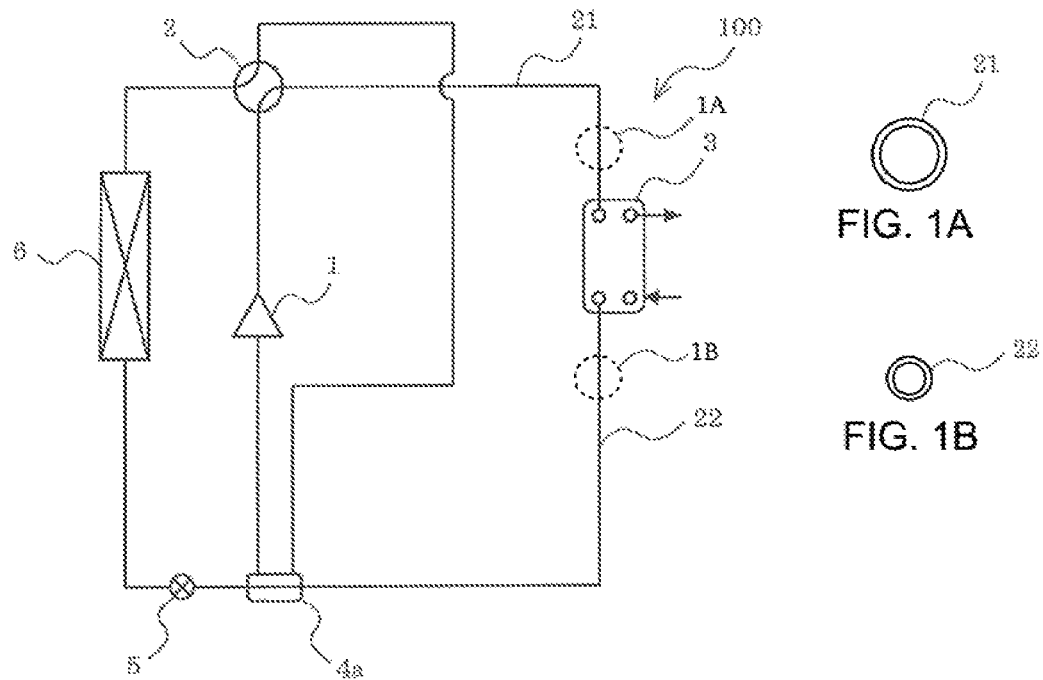
FIG. 1 is a refrigeration circuit diagram of a refrigeration cycle apparatus 100 according to Embodiment 1 of the present invention.

FIG. 1 is a refrigerant circuit diagram of a refrigeration cycle apparatus 100 according to Embodiment 1 of the present invention. FIG. 1 is an illustration of a state of carrying out a heating operation for increasing the temperature of water on a load side.

As illustrated in FIG. 1, the refrigeration cycle apparatus 100 includes a compressor 1, a four-way valve 2, a condenser 3, an expansion valve 5, and an evaporator 6 connected in a loop, and an auxiliary heat exchanger 4a configured to exchange heat between refrigerant flowing from the condenser 3 toward the expansion valve 5 and refrigerant flowing from the evaporator 6 toward the compressor 1.

The compressor 1 is comprised of, for example, a capacity-controllable inverter compressor, and is configured to suck and compress low-temperature and low-pressure gas refrigerant into a state of high-temperature and high-pressure gas refrigerant, and to discharge the high-temperature and high-pressure gas refrigerant.

The four-way valve 2 is configured to switch directions of the high-temperature and high-pressure gas refrigerant discharged from the compressor 1 and the low-temperature and low-pressure gas refrigerant to be sucked into the compressor 1.

The condenser 3 is comprised of, for example, a plate heat exchanger, and is configured to exchange heat between the refrigerant and the water to reject heat from the refrigerant.

The auxiliary heat exchanger 4a is configured to exchange heat between streams of the refrigerant flowing through the auxiliary heat exchanger 4a.

The expansion valve 5 is configured to decompress the refrigerant into low-pressure two-phase refrigerant.

The evaporator 6 is comprised of, for example, a plate-fin heat exchanger, and is configured to exchange heat between the refrigerant and air to evaporate the refrigerant.

A high-pressure gas pipe 21 is provided so as to connect the compressor 1 and the condenser 3. Further, a high-pressure liquid pipe 22 is provided so as to connect the condenser 3 and the expansion valve 5. The diameter of the high-pressure liquid pipe 22 as shown in FIG. 1B is smaller than the diameter of the high-pressure gas pipe 21 as shown in FIG. 1A.

In Embodiment 1, refrigerant including a HFO-1123 refrigerant is used. The refrigerant may be the HFO-1123 refrigerant alone or the HFO-1123 mixed with R32 or HFO-1234yf at a ratio of from 20% to 50%. The HFO-1123 refrigerant has a global warming potential (GWP) of 0.3, which is lower than 2,090 of a related-art R410A refrigerant. Thus, the HFO-1123 refrigerant is a refrigerant having small influence on the global environment. When high energy is input, however, a chemical reaction involving heat generation may proceed in the HFO-1123 refrigerant, thereby causing a risk of significant pressure increase along with abrupt temperature increase, in particular, causing a risk of pressure increase in liquid refrigerant.

Figure 30:
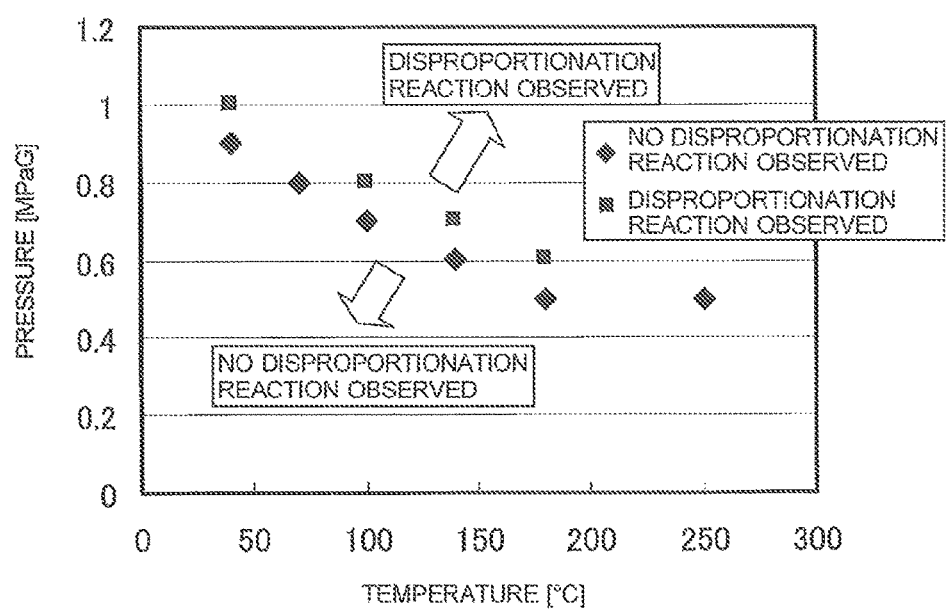
FIG. 30 is a graph of test results of disproportionation reaction in a case of a HFO-1123 refrigerant alone.

FIG. 30 is a graph of test results of disproportionation reaction in the case of the HFO-1123 refrigerant alone, for showing such a characteristic that the disproportionation reaction is liable to occur as the pressure and the temperature are high. When R32 or HFO-1234yf is mixed with HFO-1123, the range causing the disproportionation reaction is shifted to a high-pressure and high-temperature side, but the disproportionation reaction is still liable to occur as the pressure and the temperature are high.

Next, an operation of a refrigeration cycle of the refrigeration cycle apparatus 100 according to Embodiment 1 is described with reference to FIG. 1.

Refrigerant in a low-temperature and low-pressure gas state is sucked into the compressor 1 and compressed into high-temperature and high-pressure gas, and the high-temperature and high-pressure gas is discharged from the compressor 1. The high-temperature and high-pressure refrigerant discharged from the compressor 1 flows into the condenser 3 via the four-way valve 2. The high-temperature and high-pressure gas refrigerant flowing into the condenser 3 rejects heat to water being a heat exchange medium to turn into liquid refrigerant. The liquid refrigerant flowing out of the condenser 3 passes through the auxiliary heat exchanger 4a to flow into the expansion valve 5. In the expansion valve 5, the refrigerant is decompressed and expanded into two-phase gas-liquid refrigerant. The two-phase gas-liquid refrigerant flowing out of the expansion valve 5 flows into the evaporator 6, and evaporates by cooling air being a heat exchange medium to turn into low-temperature and low-pressure gas refrigerant. The low-temperature and low-pressure gas refrigerant flowing out of the evaporator 6 passes through the auxiliary heat exchanger 4a again, and is then sucked into the compressor 1 again.

In the auxiliary heat exchanger 4a, heat is exchanged between the liquid refrigerant flowing out of the condenser 3 and the gas flowing out of the evaporator 6. Therefore, the liquid refrigerant flowing out of the condenser 3 is cooled into a subcooled state, and then flows into the expansion valve 5.

As described above, the refrigeration cycle apparatus 100 according to Embodiment 1 is configured such that the liquid refrigerant to be caused to flow into the expansion valve 5 is cooled and caused to flow into the expansion valve 5 under the subcooled state. Therefore, it is possible to prevent pressure pulsation of the liquid refrigerant or shock waves, which may be caused by the inflow of the two-phase refrigerant into the expansion valve 5. Thus, it is possible to provide a refrigeration cycle apparatus 100 that operates safely and suppresses the influence on the global environment, by suppressing the disproportionation reaction even when the HFO-1123 refrigerant is used. Further, the condenser 3 is a plate heat exchanger, and hence the amount of the high-pressure refrigerant can be reduced. Thus, it is possible to reduce the risk of the disproportionation reaction. Still further, the diameter of the high-pressure liquid pipe 22 is smaller than the diameter of the high-pressure gas pipe 21, and hence the amount of the high-pressure liquid refrigerant that is liable to cause the disproportionation reaction is reduced. Thus, it is possible to reduce the risk of the disproportionation reaction.

Figure 2:
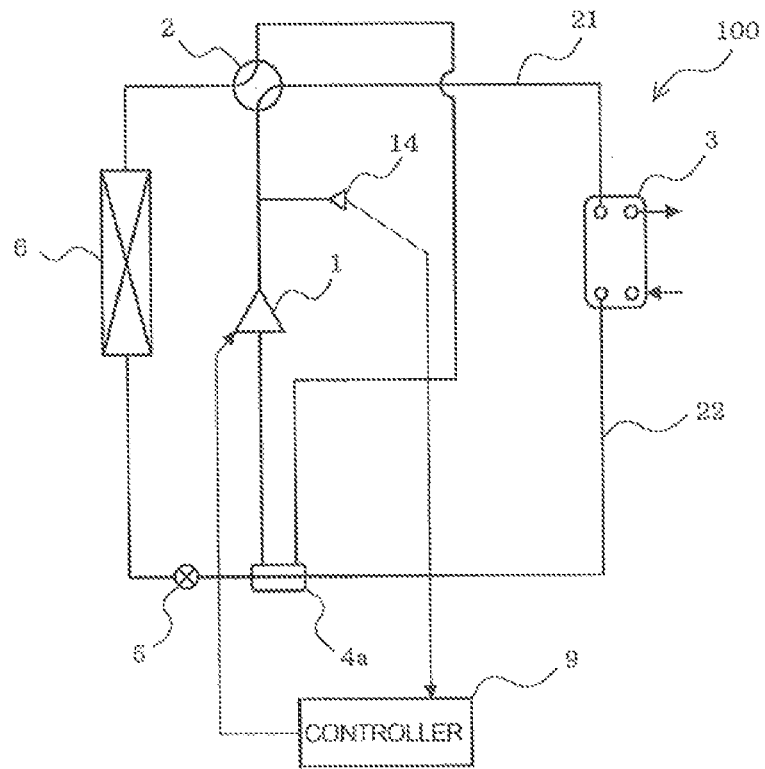
FIG. 2 is a system configuration diagram of the refrigeration cycle apparatus 100 according to Embodiment 1 of the present invention.
Figure 3:
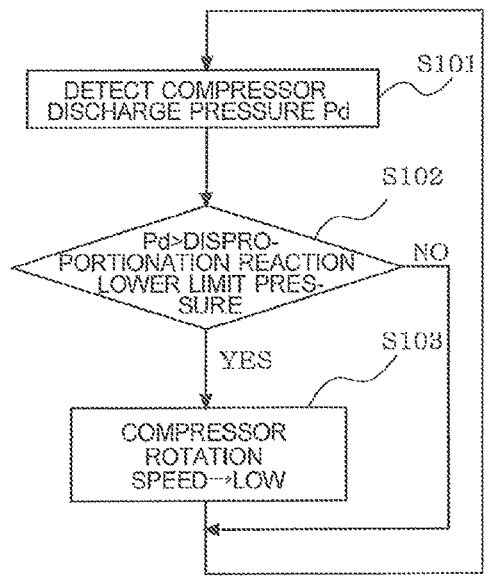
FIG. 3 is a flowchart of a procedure of controlling a rotation speed of a compressor of the refrigeration cycle apparatus 100 according to Embodiment 1 of the present invention.

FIG. 2 is a system configuration diagram of the refrigeration cycle apparatus 100 according to Embodiment 1 of the present invention. FIG. 2 is an illustration of the state of carrying out the heating operation for increasing the temperature of the water on the load side. FIG. 3 is a flowchart of a procedure of controlling a rotation speed of the compressor of the refrigeration cycle apparatus 100 according to Embodiment 1 of the present invention.

As illustrated in FIG. 2, the refrigeration cycle apparatus 100 according to Embodiment 1 includes a high-pressure sensor 14 and a controller 9. The other constituent elements of the refrigeration cycle apparatus 100 of FIG. 2 are the same as those of the refrigeration cycle apparatus 100 of FIG. 1.

Next, an operation of the control to be carried out in the refrigeration cycle apparatus 100 according to Embodiment 1 is described with reference to FIG. 2 and FIG. 3.

In Step S101, a high pressure Pd of the refrigeration cycle, which is detected by the high-pressure sensor 14, is input to the controller 9, and then the operation proceeds to Step S102.

In Step S102, the controller 9 compares the high pressure Pd detected by the high-pressure sensor 14 and a lower limit pressure causing the disproportionation reaction that is set in advance.

When the controller 9 determines in Step S102 that the high pressure Pd detected by the high-pressure sensor 14 is higher than the lower limit pressure of the disproportionation reaction (YES in Step S102), the operation proceeds to Step S103. When the controller 9 determines in Step S102 that the high pressure Pd detected by the high-pressure sensor 14 is equal to or lower than the lower limit pressure of the disproportionation reaction (NO in Step S102), the operation returns to Step S101.

In Step S103, the controller 9 outputs a control signal for controlling the rotation speed of the compressor 1 to be reduced, and then the operation returns to Step S101.

As described above, the refrigeration cycle apparatus 100 according to Embodiment 1 is configured to control the rotation speed of the compressor 1 so that the high pressure Pd detected by the high-pressure sensor 14 does not become higher than the lower limit pressure causing the disproportionation reaction. Therefore, the disproportionation reaction is suppressed even when the HFO-1123 refrigerant is used. Thus, it is possible to provide the refrigeration cycle apparatus 100 that operates safely and suppresses the influence on the global environment.

Figure 4:
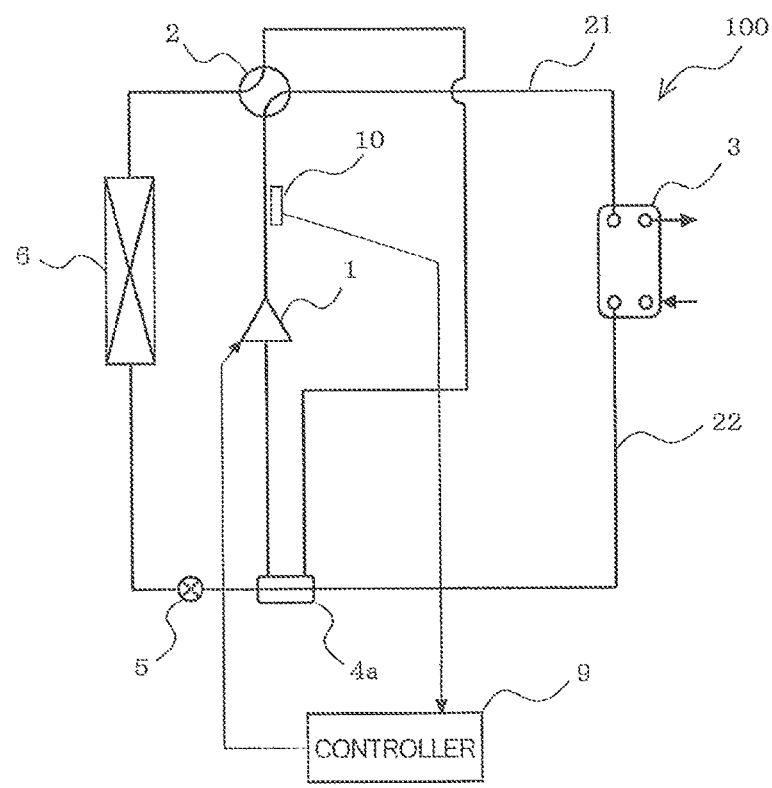
FIG. 4 is a system configuration diagram of another example of the refrigeration cycle apparatus 100 according to Embodiment 1 of the present invention.
Figure 5:
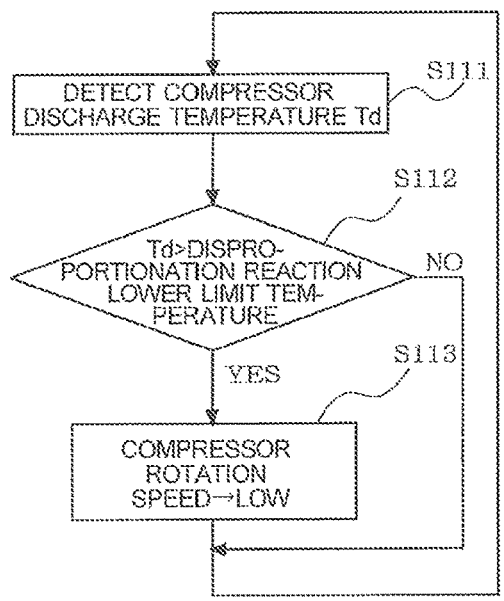
FIG. 5 is a flowchart of a procedure of controlling the rotation speed of the compressor of the refrigeration cycle apparatus 100 of FIG. 4.

FIG. 4 is a system configuration diagram of another example of the refrigeration cycle apparatus 100 according to Embodiment 1 of the present invention. FIG. 4 is an illustration of the state of carrying out the heating operation for increasing the temperature of the water on the load side. FIG. 5 is a flowchart of a procedure of controlling the rotation speed of the compressor of the refrigeration cycle apparatus 100 of FIG. 4.

As illustrated in FIG. 4, the refrigeration cycle apparatus 100 according to Embodiment 1 includes a discharge temperature sensor 10 and the controller 9. The other constituent elements of the refrigeration cycle apparatus 100 of FIG. 4 are the same as those of the refrigeration cycle apparatus 100 of FIG. 1.

Next, an operation of the control to be carried out in the refrigeration cycle apparatus 100 according to Embodiment 1 is described with reference to FIG. 4 and FIG. 5.

In Step S111, a discharge temperature Td of the refrigeration cycle, which is detected by the discharge temperature sensor 10, is input to the controller 9, and then the operation proceeds to Step S112.

In Step S112, the controller 9 compares the discharge temperature Td detected by the discharge temperature sensor 10 and a lower limit temperature causing the disproportionation reaction that is set in advance.

When the controller 9 determines in Step S112 that the discharge temperature Td detected by the discharge temperature sensor 10 is higher than the lower limit temperature of the disproportionation reaction (YES in Step S112), the operation proceeds to Step S113.

When the controller 9 determines in Step S112 that the discharge temperature Td detected by the discharge temperature sensor 10 is equal to or lower than the lower limit temperature of the disproportionation reaction (NO in Step S112), the operation returns to Step S111.

In Step S113, the controller 9 outputs a control signal for controlling the rotation speed of the compressor 1 to be reduced, and then the operation returns to Step S111.

As described above, the refrigeration cycle apparatus 100 according to Embodiment 1 is configured to control the rotation speed of the compressor 1 so that the discharge temperature Td does not become higher than the lower limit temperature causing the disproportionation reaction. Therefore, the disproportionation reaction is suppressed even when the HFO-1123 refrigerant is used. Thus, it is possible to provide the refrigeration cycle apparatus 100 that operates safely and suppresses the influence on the global environment.

Embodiment 2

Figure 6:
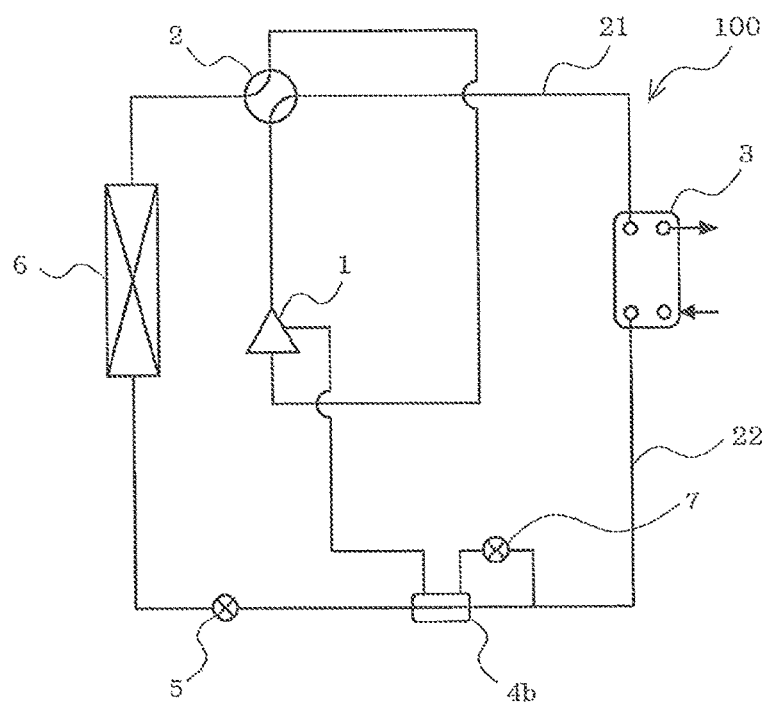
FIG. 6 is a refrigerant circuit diagram of a refrigeration cycle apparatus 100 according to Embodiment 2 of the present invention.

FIG. 6 is a refrigerant circuit diagram of a refrigeration cycle apparatus 100 according to Embodiment 2 of the present invention. FIG. 6 is an illustration of a state of carrying out a heating operation for increasing the temperature of water on a load side. In Embodiment 2, the same constituent elements as those of Embodiment 1 are represented by the same reference symbols. Also in Embodiment 2, the refrigerant including the HFO-1123 refrigerant is used as in Embodiment 1.

As illustrated in FIG. 6, the refrigeration cycle apparatus 100 according to Embodiment 2 includes the compressor 1, the four-way valve 2, the condenser 3, the expansion valve 5, and the evaporator 6 connected in a loop, and an auxiliary heat exchanger 4b configured to exchange heat between the refrigerant at the outlet side of the condenser 3 and a part of the refrigerant, which is branched at the outlet side of the condenser 3 and decompressed by an auxiliary expansion valve 7. The refrigeration cycle apparatus 100 according to Embodiment 2 is configured such that the refrigerant decompressed by the auxiliary expansion valve 7 and subjected to heat exchange by the auxiliary heat exchanger 4b is injected into a compression chamber of the compressor 1. The auxiliary heat exchanger 4b is configured to exchange heat between streams of the refrigerant flowing through the auxiliary heat exchanger 4b. The auxiliary expansion valve 7 is configured to decompress the refrigerant into two-phase refrigerant.

Next, an operation of a refrigeration cycle of the refrigeration cycle apparatus 100 according to Embodiment 2 is described with reference to FIG. 6.

Refrigerant in a low-temperature and low-pressure gas state is sucked into the compressor 1 and compressed into high-temperature and high-pressure gas, and the high-temperature and high-pressure gas is discharged from the compressor 1. The high-temperature and high-pressure refrigerant discharged from the compressor 1 flows into the condenser 3 via the four-way valve 2. The high-temperature and high-pressure gas refrigerant flowing into the condenser 3 rejects heat to water being a heat exchange medium to turn into liquid refrigerant. The liquid refrigerant flowing out of the condenser 3 is branched into two streams. One of the two streams passes through the auxiliary heat exchanger 4b, and then flows into the expansion valve 5. Then, the stream of the liquid refrigerant is decompressed and expanded into two-phase gas-liquid refrigerant. The two-phase gas-liquid refrigerant flowing out of the expansion valve 5 flows into the evaporator 6, and evaporates by cooling air being a heat exchange medium to turn into low-temperature and low-pressure gas refrigerant. The low-temperature and low-pressure gas refrigerant flowing out of the evaporator 6 is sucked into the compressor 1 again. The other stream of the branched liquid refrigerant flows into the auxiliary expansion valve 7, and is decompressed and expanded into two-phase refrigerant. The two-phase refrigerant passes through the auxiliary heat exchanger 4b, and is then injected into the compression chamber of the compressor 1.

In the auxiliary heat exchanger 4b, heat is exchanged between the liquid refrigerant flowing out of the condenser 3 and the two-phase refrigerant obtained after branching and being decompressed. Therefore, the liquid refrigerant to be caused to flow into the expansion valve 5 is cooled into a subcooled state.

As described above, the refrigeration cycle apparatus 100 according to Embodiment 2 is configured such that the liquid refrigerant to be caused to flow into the expansion valve 5 is cooled and caused to flow into the expansion valve 5 under the subcooled state. Therefore, it is possible to prevent pressure pulsation of the liquid refrigerant or shock waves, which may be caused by the inflow of the two-phase refrigerant into the expansion valve 5. Thus, it is possible to provide a refrigeration cycle apparatus 100 that operates safely and suppresses the influence on the global environment, by suppressing the disproportionation reaction even when the HFO-1123 refrigerant is used.

Figure 7:
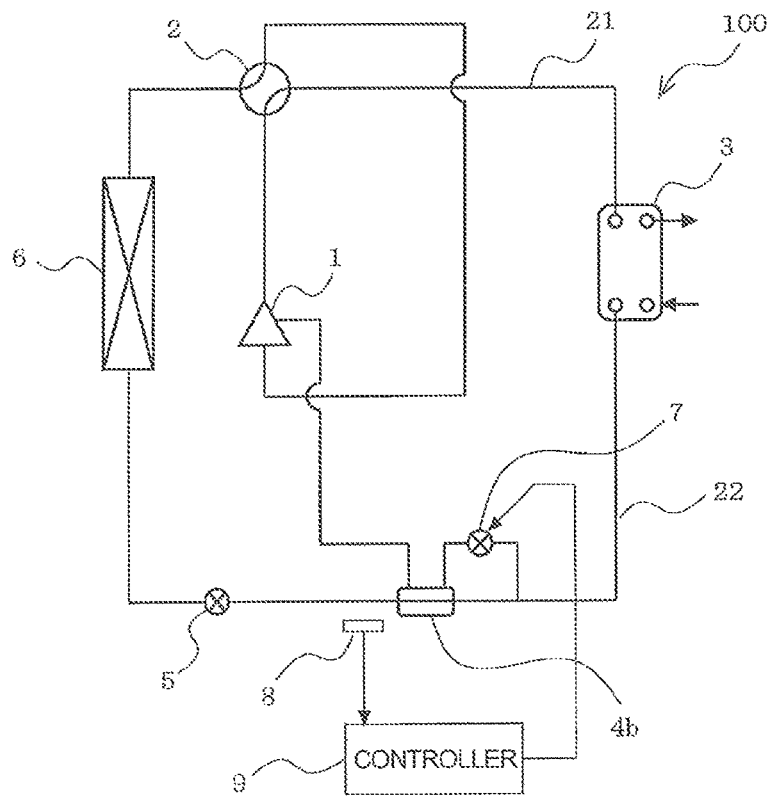
FIG. 7 is a system configuration diagram of the refrigeration cycle apparatus 100 according to Embodiment 2 of the present invention.
Figure 8:
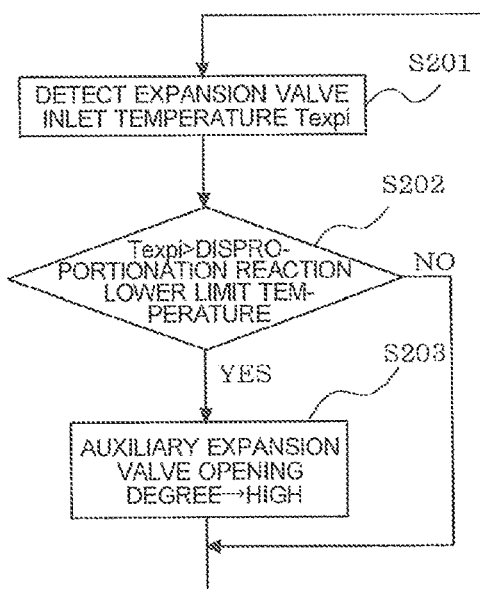
FIG. 8 is a flowchart of a procedure of controlling an auxiliary expansion valve 7 of the refrigeration cycle apparatus 100 of FIG. 7.

FIG. 7 is a system configuration diagram of the refrigeration cycle apparatus 100 according to Embodiment 2 of the present invention. FIG. 7 is an illustration of the state of carrying out the heating operation for increasing the temperature of the water on the load side. FIG. 8 is a flowchart of a procedure of controlling the auxiliary expansion valve 7 of the refrigeration cycle apparatus 100 of FIG. 7.

As illustrated in FIG. 7, the refrigeration cycle apparatus 100 according to Embodiment 2 includes an expansion valve inlet temperature sensor 8 and the controller 9. The other constituent elements of the refrigeration cycle apparatus 100 of FIG. 7 are represented by the same reference symbols as those of FIG. 1.

Next, an operation of the control to be carried out in the refrigeration cycle apparatus 100 according to Embodiment 2 is described with reference to FIG. 7 and FIG. 8.

In Step S201, an expansion valve inlet temperature Texpi of the refrigeration cycle, which is detected by the expansion valve inlet temperature sensor 8, is input to the controller 9, and then the operation proceeds to Step S202.

In Step S202, the controller 9 compares the expansion valve inlet temperature Texpi detected by the expansion valve inlet temperature sensor 8 and a lower limit temperature causing the disproportionation reaction that is set in advance.

When the controller 9 determines in Step S202 that the expansion valve inlet temperature Texpi detected by the expansion valve inlet temperature sensor 8 is higher than the lower limit temperature of the disproportionation reaction (YES in Step S202), the operation proceeds to Step S203.

When the controller 9 determines in Step S202 that the expansion valve inlet temperature Texpi detected by the expansion valve inlet temperature sensor 8 is equal to or lower than the lower limit temperature of the disproportionation reaction (NO in Step S202), the operation returns to Step S201.

In Step 203, the controller 9 outputs a control signal for controlling an opening degree of the auxiliary expansion valve 7 to be increased, and then the operation returns to Step S201.

As described above, the refrigeration cycle apparatus 100 according to Embodiment 2 is configured to control the opening degree of the auxiliary expansion valve 7 so that the expansion valve inlet temperature Texpi does not become higher than the lower limit temperature causing the disproportionation reaction. Therefore, the disproportionation reaction is suppressed even when the HFO-1123 refrigerant is used. Thus, it is possible to provide the refrigeration cycle apparatus 100 that operates safely and suppresses the influence on the global environment.

Figure 9:
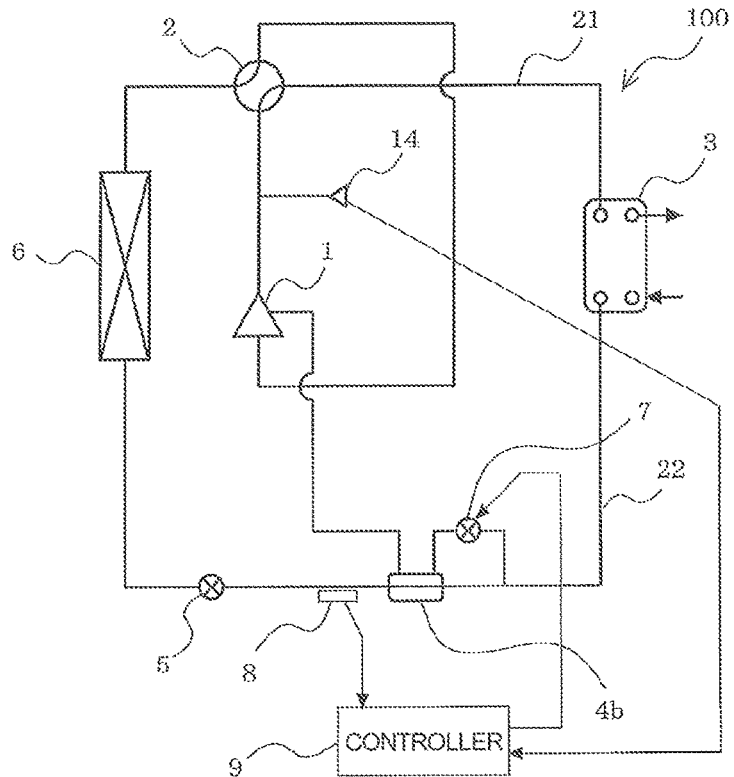
FIG. 9 is a system configuration diagram of another example of the refrigeration cycle apparatus 100 according to Embodiment 2 of the present invention.
Figure 10:
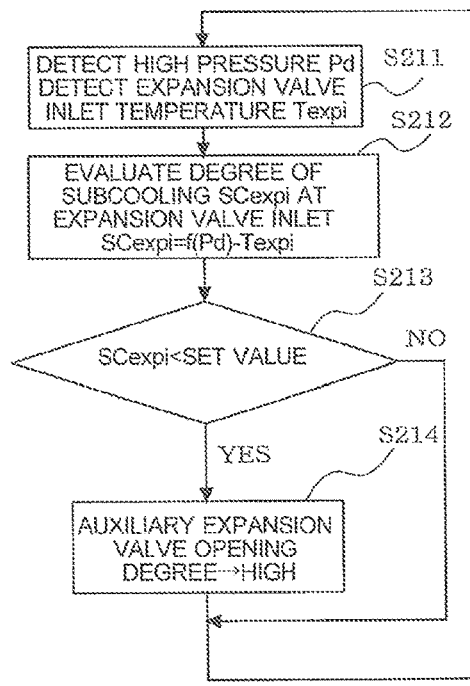
FIG. 10 is a flowchart of a procedure of controlling the auxiliary expansion valve 7 of the refrigeration cycle apparatus 100 of FIG. 9.

FIG. 9 is a system configuration diagram of another example of the refrigeration cycle apparatus 100 according to Embodiment 2 of the present invention. FIG. 9 is an illustration of the state of carrying out the heating operation for increasing the temperature of the water on the load side. FIG. 10 is a flowchart of a procedure of controlling the auxiliary expansion valve 7 of the refrigeration cycle apparatus 100 of FIG. 9.

As illustrated in FIG. 9, the refrigeration cycle apparatus 100 according to Embodiment 2 includes the expansion valve inlet temperature sensor 8, the high-pressure sensor 14, and the controller 9. The other constituent elements that are the same as those of Embodiment 1 are represented by the same reference symbols.

Next, an operation of the control to be carried out in the refrigeration cycle apparatus 100 according to Embodiment 2 is described with reference to FIG. 9 and FIG. 10.

In Step S211, the expansion valve inlet temperature Texpi of the refrigeration cycle, which is detected by the expansion valve inlet temperature sensor 8, and the high pressure Pd of the refrigeration cycle, which is detected by the high-pressure sensor 14, are input to the controller 9, and then the operation proceeds to Step S212.

In Step S212, the controller 9 evaluates a saturation temperature based on the high pressure Pd detected by the high-pressure sensor 14, and computes a degree of subcooling SCexpi at the inlet of the expansion valve 5 based on a difference between the saturation temperature evaluated based on the high pressure Pd and the expansion valve inlet temperature Texpi. Then, the operation proceeds to Step S213.

In Step S213, the controller 9 compares the computed degree of subcooling SCexpi at the inlet of the expansion valve 5 and a set value that is set in advance.

When the controller 9 determines in Step S213 that the degree of subcooling SCexpi at the inlet of the expansion valve 5 is lower than the set value that is set in advance (YES in Step S213), the operation proceeds to Step S214.

When the controller 9 determines in Step S213 that the degree of subcooling SCexpi at the inlet of the expansion valve 5 is equal to or higher than the set value that is set in advance (NO in Step S213), the operation returns to Step S211.

In Step S214, the controller 9 outputs a control signal for controlling the opening degree of the auxiliary expansion valve 7 to be increased, and then the operation returns to Step S211.

As described above, the refrigeration cycle apparatus 100 according to Embodiment 2 is configured such that the degree of subcooling SCexpi at the inlet of the expansion valve is secured to have a value equal to or higher than the set value, and then the liquid refrigerant is caused to flow into the expansion valve 5 under the subcooled state. Therefore, it is possible to prevent pressure pulsation of the high-pressure liquid refrigerant or shock waves, which may be caused by the inflow of the two-phase refrigerant into the expansion valve 5. Thus, it is possible to provide the refrigeration cycle apparatus 100 that operates safely and suppresses the influence on the global environment, by suppressing the disproportionation reaction even when the HFO-1123 refrigerant is used.

Embodiment 3

Figure 11:
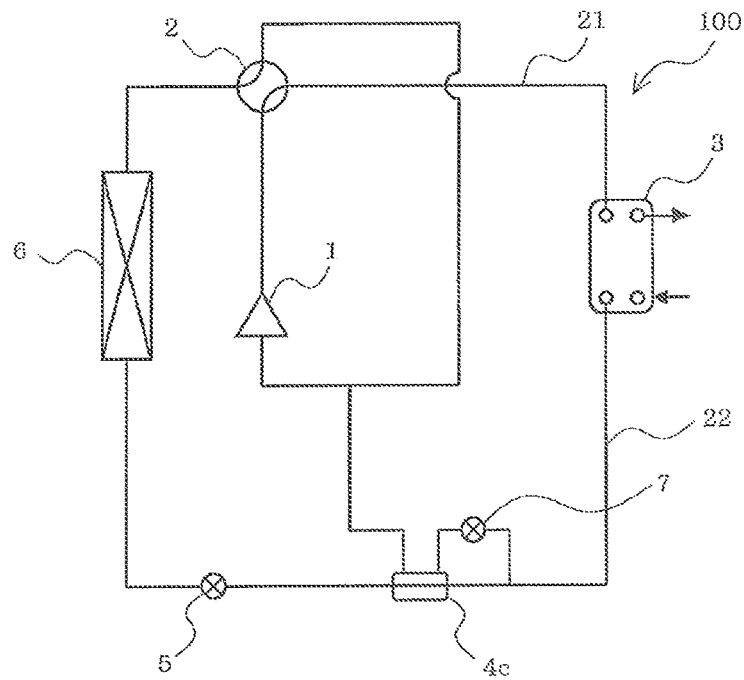
FIG. 11 is a refrigerant circuit diagram of a refrigeration cycle apparatus 100 according to Embodiment 3 of the present invention.

FIG. 11 is a refrigerant circuit diagram of a refrigeration cycle apparatus 100 according to Embodiment 3 of the present invention. FIG. 11 is an illustration of a state of carrying out a heating operation for increasing the temperature of water on a load side. In Embodiment 3, the same constituent elements as those of Embodiment 1 are represented by the same reference symbols. Also in Embodiment 3, the refrigerant including the HFO-1123 refrigerant is used as in Embodiments 1 and 2.

As illustrated in FIG. 11, the refrigeration cycle apparatus 100 according to Embodiment 3 includes the compressor 1, the four-way valve 2, the condenser 3, the expansion valve 5, and the evaporator 6 connected in a loop, and an auxiliary heat exchanger 4c configured to exchange heat between the refrigerant at the outlet side of the condenser 3 and a part of the refrigerant, which is branched at the outlet side of the condenser 3 and decompressed by the auxiliary expansion valve 7. The refrigeration cycle apparatus 100 according to Embodiment 3 is configured such that the refrigerant decompressed by the auxiliary expansion valve 7 and subjected to heat exchange by the auxiliary heat exchanger 4c is caused to join the refrigerant on the suction side of the compressor 1. The auxiliary heat exchanger 4c is configured to exchange heat between streams of the refrigerant flowing through the auxiliary heat exchanger 4c. The auxiliary expansion valve 7 is configured to decompress the refrigerant into two-phase refrigerant.

Next, an operation of a refrigeration cycle of the refrigeration cycle apparatus 100 according to Embodiment 3 is described with reference to FIG. 11.

Refrigerant in a low-temperature and low-pressure gas state is sucked into the compressor 1 and compressed into high-temperature and high-pressure gas, and the high-temperature and high-pressure gas is discharged from the compressor 1. The high-temperature and high-pressure refrigerant discharged from the compressor 1 flows into the condenser 3 via the four-way valve 2. The high-temperature and high-pressure gas refrigerant flowing into the condenser 3 rejects heat to water being a heat exchange medium to turn into liquid refrigerant. The liquid refrigerant flowing out of the condenser 3 is branched into two streams. One of the two streams passes through the auxiliary heat exchanger 4c, and then flows into the expansion valve 5. Then, the stream of the liquid refrigerant is decompressed and expanded into two-phase gas-liquid refrigerant. The two-phase gas-liquid refrigerant flowing out of the expansion valve 5 flows into the evaporator 6, and evaporates by cooling air being a heat exchange medium to turn into low-temperature and low-pressure gas refrigerant. The low-temperature and low-pressure gas refrigerant flowing out of the evaporator 6 is sucked into the compressor 1 again. The other stream of the branched liquid refrigerant flows into the auxiliary expansion valve 7, and is decompressed and expanded into two-phase refrigerant. The two-phase refrigerant passes through the auxiliary heat exchanger 4c, and is then caused to join the refrigerant on the suction side of the compressor 1.

In the auxiliary heat exchanger 4c, heat is exchanged between the liquid refrigerant flowing out of the condenser 3 and the two-phase refrigerant obtained after branching and being decompressed. Therefore, the liquid refrigerant to be caused to flow into the expansion valve 5 is cooled into a subcooled state.

As described above, the refrigeration cycle apparatus 100 according to Embodiment 3 is configured such that the liquid refrigerant to be caused to flow into the expansion valve 5 is cooled and caused to flow into the expansion valve 5 under the subcooled state. Therefore, it is possible to prevent pressure pulsation of the high-pressure liquid refrigerant or shock waves, which may be caused by the inflow of the two-phase refrigerant into the expansion valve 5. Thus, it is possible to provide a refrigeration cycle apparatus 100 that operates safely and suppresses the influence on the global environment, by suppressing the disproportionation reaction even when the HFO-1123 refrigerant is used.

Figure 12:
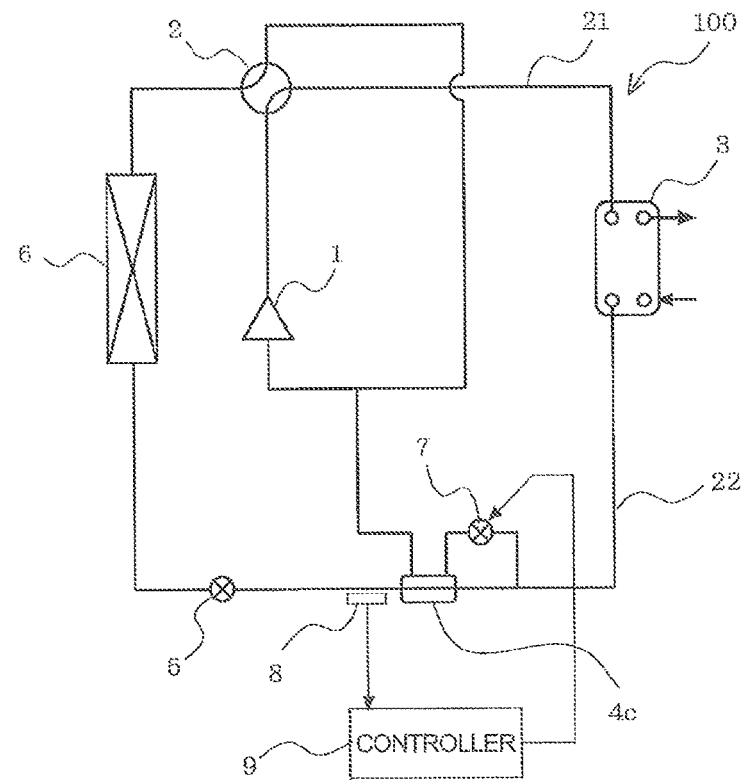
FIG. 12 is a system configuration diagram of the refrigeration cycle apparatus 100 according to Embodiment 3 of the present invention.

FIG. 12 is a system configuration diagram of the refrigeration cycle apparatus 100 according to Embodiment 3 of the present invention. FIG. 12 is an illustration of the state of carrying out the heating operation for increasing the temperature of the water on the load side.

As illustrated in FIG. 12, the refrigeration cycle apparatus 100 according to Embodiment 3 includes the expansion valve inlet temperature sensor 8 and the controller 9. A flowchart of a procedure of control to be carried out in the refrigeration cycle apparatus 100 of FIG. 12 is similar to that of FIG. 8, and description thereof is therefore omitted herein.

As described above, the refrigeration cycle apparatus 100 according to Embodiment 3 is configured to control the opening degree of the auxiliary expansion valve 7 so that the expansion valve inlet temperature Texpi does not become higher than the lower limit temperature causing the disproportionation reaction. Therefore, the disproportionation reaction is suppressed even when the HFO-1123 refrigerant is used. Thus, it is possible to provide the refrigeration cycle apparatus 100 that operates safely and suppresses the influence on the global environment.

Figure 13:
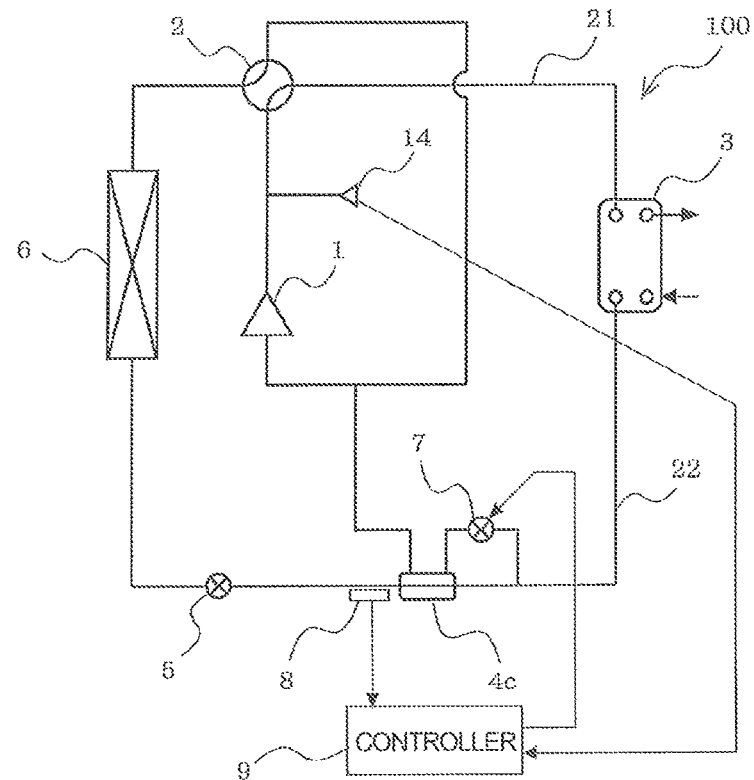
FIG. 13 is a system configuration diagram of another example of the refrigeration cycle apparatus 100 according to Embodiment 3 of the present invention.

FIG. 13 is a system configuration diagram of another example of the refrigeration cycle apparatus 100 according to Embodiment 3 of the present invention. FIG. 13 is an illustration of the state of carrying out the heating operation for increasing the temperature of the water on the load side.

As illustrated in FIG. 13, the refrigeration cycle apparatus 100 according to Embodiment 3 includes the expansion valve inlet temperature sensor 8, the high-pressure sensor 14, and the controller 9. A flowchart of a procedure of control to be carried out in the refrigeration cycle apparatus 100 of FIG. 13 is similar to that of FIG. 10, and description thereof is therefore omitted herein.

As described above, the refrigeration cycle apparatus 100 according to Embodiment 3 is configured such that the degree of subcooling SCexpi at the inlet of the expansion valve is secured to have a value equal to or higher than the set value, and then the liquid refrigerant is caused to flow into the expansion valve 5 under the subcooled state. Therefore, it is possible to prevent pressure pulsation of the high-pressure liquid refrigerant or shock waves, which may be caused by the inflow of the two-phase refrigerant into the expansion valve 5. Thus, it is possible to provide the refrigeration cycle apparatus 100 that operates safely and suppresses the influence on the global environment, by suppressing the disproportionation reaction even when the HFO-1123 refrigerant is used.

Embodiment 4

Figure 14:
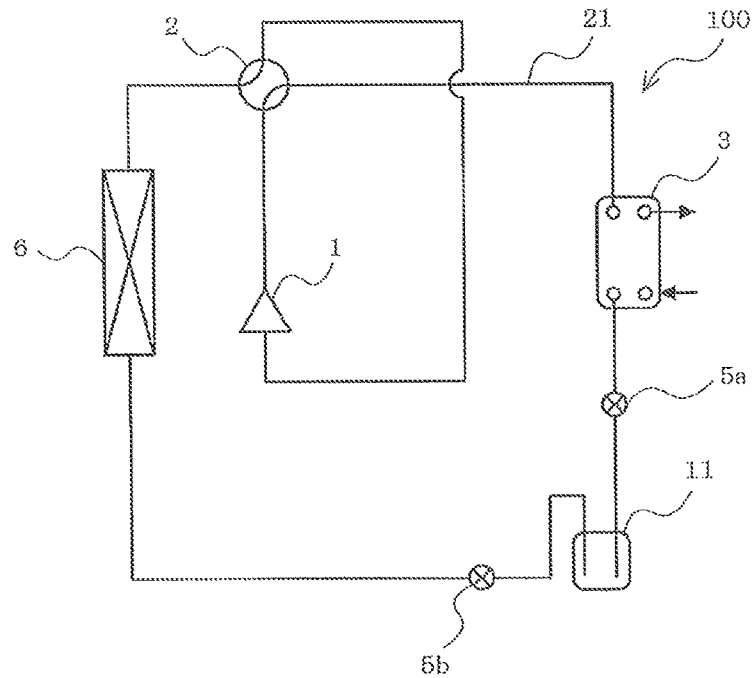
FIG. 14 is a refrigerant circuit diagram of a refrigeration cycle apparatus 100 according to Embodiment 4 of the present invention.

FIG. 14 is a refrigerant circuit diagram of a refrigeration cycle apparatus 100 according to Embodiment 4 of the present invention. FIG. 14 is an illustration of a state of carrying out a heating operation for increasing the temperature of water on a load side. In Embodiment 4, the same constituent elements as those of Embodiment 1 are represented by the same reference symbols. Also in Embodiment 4, the refrigerant including the HFO-1123 refrigerant is used as in Embodiments 1 to 3.

As illustrated in FIG. 14, the refrigeration cycle apparatus 100 according to Embodiment 4 includes the compressor 1, the four-way valve 2, the condenser 3, a first expansion valve 5a, a second expansion valve 5b, and the evaporator 6 connected in a loop, and a receiver 11 provided between the first expansion valve 5a and the second expansion valve 5b. The first expansion valve 5a is configured to decompress the refrigerant. The second expansion valve 5b is configured to decompress the refrigerant. The receiver 11 is a container configured to accumulate, in a state of liquid refrigerant, surplus refrigerant that may be generated depending on the operation state of the refrigeration cycle apparatus 100.

Next, an operation of a refrigeration cycle of the refrigeration cycle apparatus 100 according to Embodiment 4 is described with reference to FIG. 14.

Refrigerant in a low-temperature and low-pressure gas state is sucked into the compressor 1 and compressed into high-temperature and high-pressure gas, and the high-temperature and high-pressure gas is discharged from the compressor 1. The high-temperature and high-pressure refrigerant discharged from the compressor 1 flows into the condenser 3 via the four-way valve 2. The high-temperature and high-pressure gas refrigerant flowing into the condenser 3 rejects heat to water being a heat exchange medium to turn into liquid refrigerant. The liquid refrigerant flowing out of the condenser 3 flows into the first expansion valve 5a, and is decompressed into saturated liquid refrigerant. The saturated liquid refrigerant flows into the receiver 11. The refrigerant flowing into the receiver 11 flows into the second expansion valve 5b, and is decompressed into two-phase gas-liquid refrigerant. The two-phase gas-liquid refrigerant flowing out of the second expansion valve 5b flows into the evaporator 6, and evaporates by cooling air being a heat exchange medium to turn into low-temperature and low-pressure gas refrigerant. The low-temperature and low-pressure gas refrigerant flowing out of the evaporator 6 is sucked into the compressor 1 again. Herein, surplus refrigerant generated in the refrigeration cycle is accumulated in the receiver 11 as liquid refrigerant.

As described above, the refrigeration cycle apparatus 100 according to Embodiment 4 is configured such that surplus refrigerant generated in the refrigeration cycle is decompressed and accumulated in the receiver 11. Therefore, the disproportionation reaction is suppressed even when the HFO-1123 refrigerant is used. Thus, it is possible to provide a refrigeration cycle apparatus 100 that operates safely and suppresses the influence on the global environment.

Figure 15:
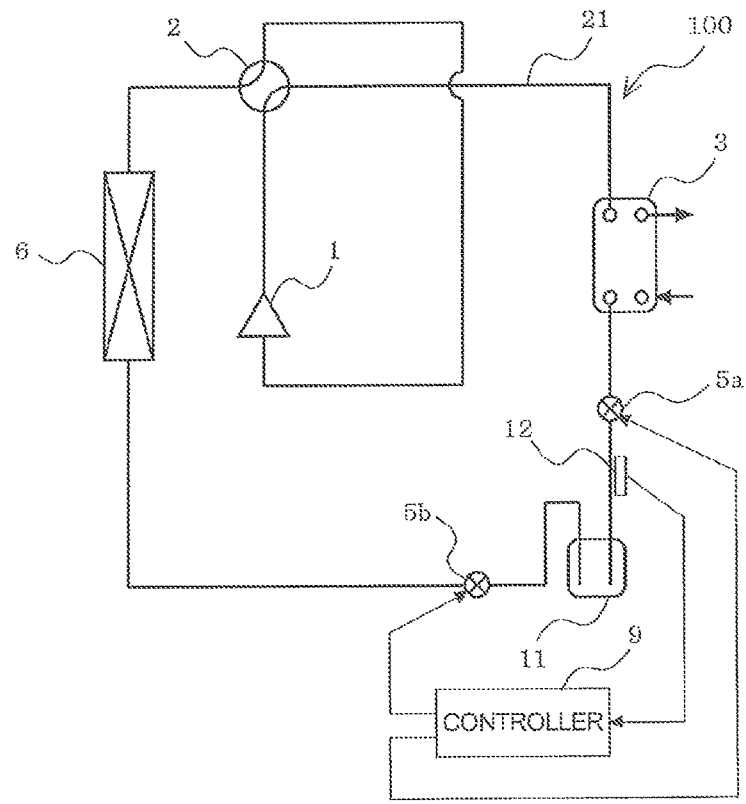
FIG. 15 is a system configuration diagram of the refrigeration cycle apparatus 100 according to Embodiment 4 of the present invention.
Figure 16:
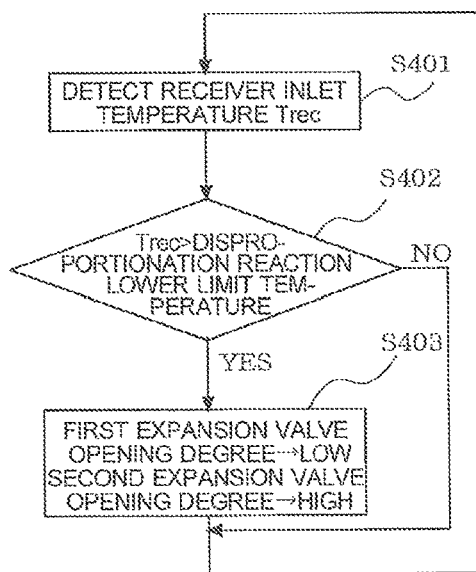
FIG. 16 is a flowchart of a procedure of controlling a first expansion valve 5a and a second expansion valve 5b of the refrigeration cycle apparatus 100 according to Embodiment 4 of the present invention.

FIG. 15 is a system configuration diagram of the refrigeration cycle apparatus 100 according to Embodiment 4 of the present invention. FIG. 15 is an illustration of the state of carrying out the heating operation for increasing the temperature of the water on the load side. FIG. 16 is a flowchart of a procedure of controlling the first expansion valve 5a and the second expansion valve 5b of the refrigeration cycle apparatus 100 according to Embodiment 4 of the present invention.

As illustrated in FIG. 15, the refrigeration cycle apparatus 100 according to Embodiment 4 includes a receiver inlet temperature sensor 12 and the controller 9. In FIG. 15, the same constituent elements as those of FIG. 14 are represented by the same reference symbols.

Next, an operation of the control to be carried out in the refrigeration cycle apparatus 100 according to Embodiment 4 is described with reference to FIG. 15 and FIG. 16.

In Step S401, a medium-pressure saturation temperature Trec of the refrigeration cycle, which is detected by the receiver inlet temperature sensor 12, is input to the controller 9, and then the operation proceeds to Step S402.

In Step S402, the controller 9 compares the medium-pressure saturation temperature Trec detected by the receiver inlet temperature sensor 12 and a lower limit temperature of the disproportionation reaction.

When the controller 9 determines in Step S402 that the medium-pressure saturation temperature Trec detected by the receiver inlet temperature sensor 12 is higher than the lower limit temperature of the disproportionation reaction (YES in Step S402), the operation proceeds to Step S403.

When the controller 9 determines in Step S402 that the medium-pressure saturation temperature Trec detected by the receiver inlet temperature sensor 12 is equal to or lower than the lower limit temperature of the disproportionation reaction (NO in Step S402), the operation returns to Step S401.

In Step S403, the controller 9 outputs a control signal for reducing the opening degree of the first expansion valve 5a and increasing the opening degree of the second expansion valve 5b so that the medium-pressure saturation temperature Trec detected by the receiver inlet temperature sensor 12 becomes equal to or lower than the lower limit temperature of the disproportionation reaction. Then, the operation returns to Step S401.

As described above, the refrigeration cycle apparatus 100 according to Embodiment 4 is configured to control the opening degree of the first expansion valve 5a to be reduced and the opening degree of the second expansion valve 5b to be increased so that the medium-pressure saturation temperature Trec becomes equal to or lower than the lower limit temperature of the disproportionation reaction. Therefore, even when the HFO-1123 refrigerant is used and surplus refrigerant is generated due to change in the operation state, the surplus refrigerant can be accumulated in the receiver under a state in which the disproportionation reaction is suppressed. Thus, it is possible to provide a refrigeration cycle apparatus 100 that operates safely and suppresses the influence on the global environment.

Figure 17:
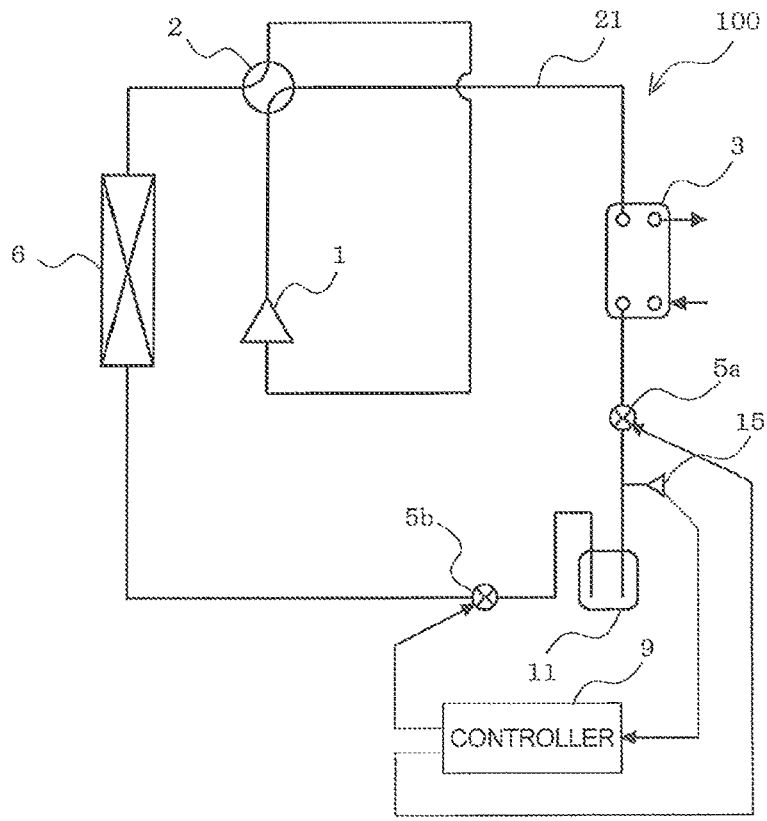
FIG. 17 is a system configuration diagram of another example of the refrigeration cycle apparatus 100 according to Embodiment 4 of the present invention.
Figure 18:
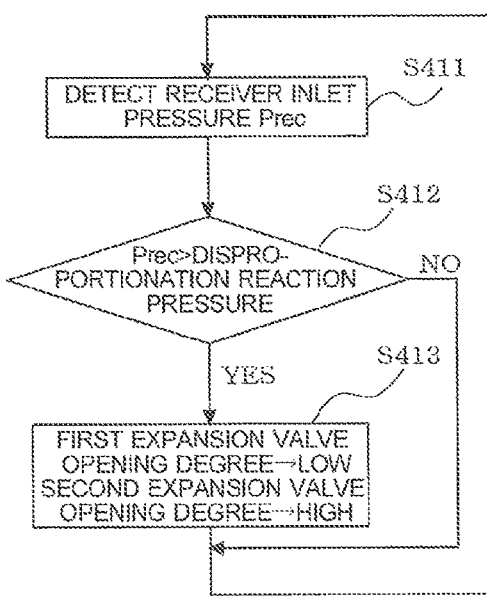
FIG. 18 is a flowchart of a procedure of controlling the first expansion valve 5a and the second expansion valve 5b of the refrigeration cycle apparatus 100 of FIG. 17.

FIG. 17 is a system configuration diagram of another example of the refrigeration cycle apparatus 100 according to Embodiment 4 of the present invention. FIG. 17 is an illustration of the state of carrying out the heating operation for increasing the temperature of the water on the load side. FIG. 18 is a flowchart of a procedure of controlling the first expansion valve 5a and the second expansion valve 5b of the refrigeration cycle apparatus 100 of FIG. 17.

As illustrated in FIG. 17, the refrigeration cycle apparatus 100 according to Embodiment 4 includes a receiver inlet pressure sensor 15 and the controller 9. In FIG. 17, the same constituent elements as those of FIG. 14 are represented by the same reference symbols.

Next, an operation of the control to be carried out in the refrigeration cycle apparatus 100 according to Embodiment 4 is described with reference to FIG. 17 and FIG. 18.

In Step S411, a receiver inlet pressure Prec of the refrigeration cycle, which is detected by the receiver inlet pressure sensor 15, is input to the controller 9, and then the operation proceeds to Step S412.

In Step S412, the controller 9 compares the receiver inlet pressure Prec detected by the receiver inlet pressure sensor 15 and a lower limit pressure of the disproportionation reaction.

When the controller 9 determines in Step S412 that the receiver inlet pressure Prec detected by the receiver inlet pressure sensor 15 is higher than the lower limit pressure of the disproportionation reaction (YES in Step S412), the operation proceeds to Step S413.

When the controller 9 determines in Step S412 that the receiver inlet pressure Prec detected by the receiver inlet pressure sensor 15 is equal to or lower than the lower limit pressure of the disproportionation reaction (NO in Step S412), the operation returns to Step S411.

In Step S413, the controller 9 outputs a control signal for reducing the opening degree of the first expansion valve 5a and increasing the opening degree of the second expansion valve 5b so that the receiver inlet pressure Prec detected by the receiver inlet pressure sensor 15 becomes equal to or lower than the lower limit pressure of the disproportionation reaction. Then, the operation returns to Step S411.

As described above, the refrigeration cycle apparatus 100 according to Embodiment 4 is configured to control the opening degree of the first expansion valve 5a to be reduced and the opening degree of the second expansion valve 5b to be increased so that the receiver inlet pressure Prec becomes equal to or lower than the lower limit pressure of the disproportionation reaction. Therefore, even when the HFO-1123 refrigerant is used and surplus refrigerant is generated due to change in the operation state, the surplus refrigerant can be accumulated in the receiver under a state in which the disproportionation reaction is suppressed. Thus, it is possible to provide the refrigeration cycle apparatus 100 that operates safely and suppresses the influence on the global environment.

Embodiment 5

Figure 19:
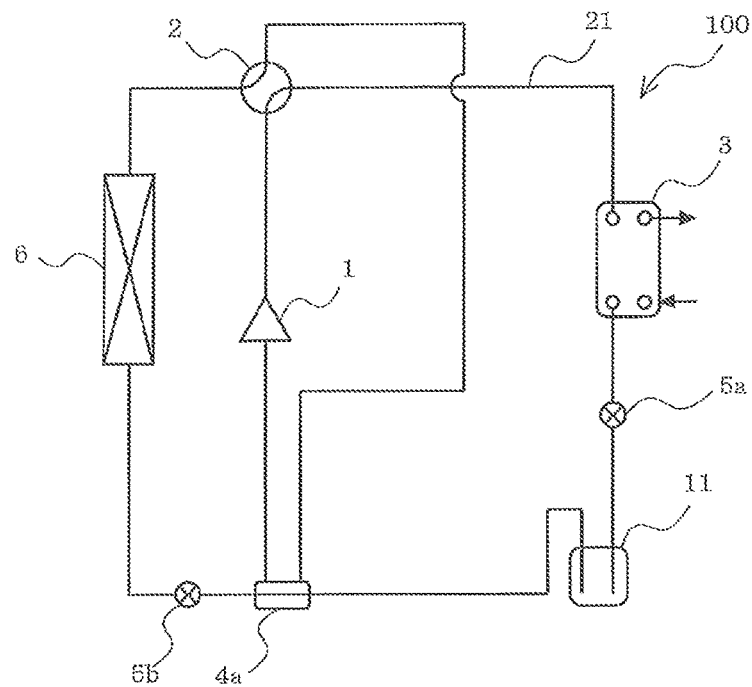
FIG. 19 is a refrigerant circuit diagram of a refrigeration cycle apparatus 100 according to Embodiment 5 of the present invention.

FIG. 19 is a refrigerant circuit diagram of a refrigeration cycle apparatus 100 according to Embodiment 5 of the present invention. FIG. 19 is an illustration of a state of carrying out a heating operation for increasing the temperature of water on a load side. In Embodiment 5, the same constituent elements as those of Embodiments 1 to 4 are represented by the same reference symbols. Also in Embodiment 5, the refrigerant including the HFO-1123 refrigerant is used as in Embodiments 1 to 4.

As illustrated in FIG. 19, the refrigeration cycle apparatus 100 according to Embodiment 5 includes the compressor 1, the four-way valve 2, the condenser 3, the first expansion valve 5a, the receiver 11, the second expansion valve 5b, and the evaporator 6 connected in a loop, and the auxiliary heat exchanger 4a configured to exchange heat between the refrigerant flowing from the condenser 3 toward the second expansion valve 5b and the low-pressure refrigerant flowing from the evaporator 6 toward the compressor 1.

Next, an operation of a refrigeration cycle of the refrigeration cycle apparatus 100 according to Embodiment 5 is described with reference to FIG. 19.

Refrigerant in a low-temperature and low-pressure gas state is sucked into the compressor 1 and compressed into high-temperature and high-pressure gas, and the high-temperature and high-pressure gas is discharged from the compressor 1. The high-temperature and high-pressure refrigerant discharged from the compressor 1 flows into the condenser 3 via the four-way valve 2. The high-temperature and high-pressure gas refrigerant flowing into the condenser 3 rejects heat to water being a heat exchange medium to turn into liquid refrigerant. The liquid refrigerant flowing out of the condenser 3 flows into the first expansion valve 5a, and is decompressed into medium-pressure saturated liquid refrigerant. The medium-pressure saturated liquid refrigerant flows into the receiver 11. The medium-pressure saturated liquid refrigerant flowing out of the receiver 11 passes through the auxiliary heat exchanger 4a. Then, the refrigerant flows into the second expansion valve 5b, and is decompressed into two-phase gas-liquid refrigerant. The two-phase gas-liquid refrigerant flowing out of the second expansion valve 5b flows into the evaporator 6, and evaporates by cooling air being a heat exchange medium to turn into gas refrigerant. The gas refrigerant flowing out of the evaporator 6 passes through the auxiliary heat exchanger 4a again, and is then sucked into the compressor 1 again.

Herein, in the auxiliary heat exchanger 4a, heat is exchanged between the liquid refrigerant flowing out of the receiver 11 and the gas flowing out of the evaporator 6. Therefore, the liquid refrigerant flowing out of the receiver 11 is cooled into a subcooled state, and then flows into the second expansion valve 5b. Herein, surplus refrigerant generated in the refrigeration cycle is accumulated in the receiver 11 as liquid refrigerant.

As described above, the refrigeration cycle apparatus 100 according to Embodiment 5 is configured such that the saturated liquid refrigerant flowing out of the receiver 11 is cooled by the auxiliary heat exchanger 4a. Therefore, it is possible to cause the liquid refrigerant in the subcooled state to securely flow into the second expansion valve 5b even when pressure loss occurs in the pipe, thereby being capable of preventing pressure pulsation of the high-pressure liquid refrigerant or shock waves, which may be caused by the inflow of the two-phase refrigerant. Thus, it is possible to provide a refrigeration cycle apparatus 100 that operates safely and suppresses the influence on the global environment, by suppressing the disproportionation reaction even when the HFO-1123 refrigerant is used. Further, it is possible to provide a refrigeration cycle apparatus 100 that operates safely and suppresses the influence on the global environment, by enabling, even when surplus refrigerant is generated due to change in the operation state, accumulation of the surplus refrigerant in the receiver 11 under a state in which the disproportionation reaction is suppressed.

Embodiment 6

Figure 20:
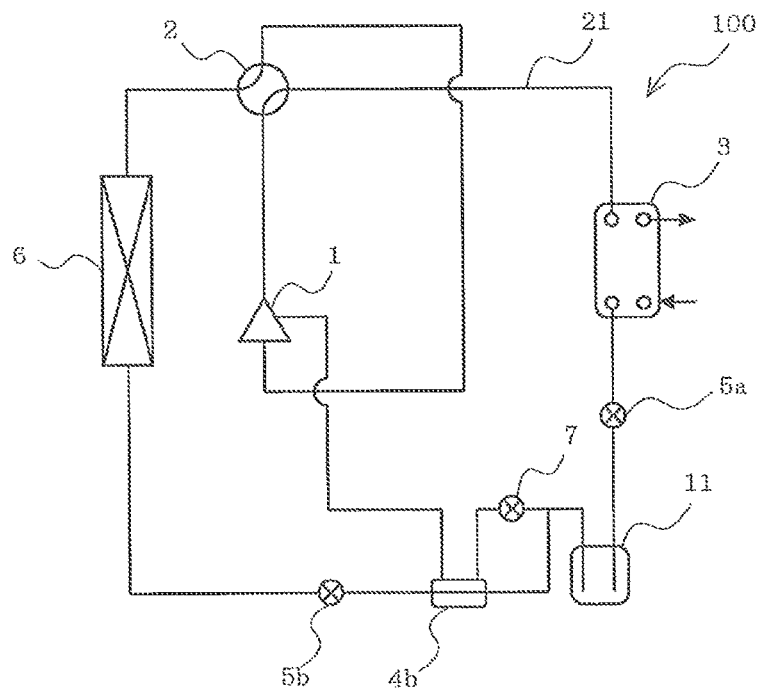
FIG. 20 is a refrigerant circuit diagram of a refrigeration cycle apparatus 100 according to Embodiment 6 of the present invention.

FIG. 20 is a refrigerant circuit diagram of a refrigeration cycle apparatus 100 according to Embodiment 6 of the present invention. FIG. 20 is an illustration of a state of carrying out a heating operation for increasing the temperature of water on a load side. In Embodiment 6, the same constituent elements as those of Embodiments 2 and 4 are represented by the same reference symbols. Also in Embodiment 6, the refrigerant including the HFO-1123 refrigerant is used as in Embodiments 1 to 5.

As illustrated in FIG. 20, the refrigeration cycle apparatus 100 according to Embodiment 6 includes the compressor 1, the four-way valve 2, the condenser 3, the first expansion valve 5a, the receiver 11, the auxiliary heat exchanger 4b, the second expansion valve 5b, and the evaporator 6 connected in a loop. The refrigeration cycle apparatus 100 according to Embodiment 6 is configured such that the auxiliary heat exchanger 4b exchanges heat between the refrigerant at the outlet side of the receiver 11 and a part of the refrigerant, which is branched at the outlet side of the receiver 11 and decompressed by the auxiliary expansion valve 7, and that the refrigerant decompressed by the auxiliary expansion valve 7 and subjected to heat exchange by the auxiliary heat exchanger 4b is injected into the compression chamber of the compressor 1.

Next, an operation of a refrigeration cycle of the refrigeration cycle apparatus 100 according to this embodiment is described with reference to FIG. 20.

Refrigerant in a low-temperature and low-pressure gas state is sucked into the compressor 1 and compressed into high-temperature and high-pressure gas, and the high-temperature and high-pressure gas is discharged from the compressor 1. The high-temperature and high-pressure refrigerant discharged from the compressor 1 flows into the condenser 3 via the four-way valve 2. The high-temperature and high-pressure gas refrigerant flowing into the condenser 3 rejects heat to water being a heat exchange medium to turn into liquid refrigerant. The liquid refrigerant flowing out of the condenser 3 flows into the first expansion valve 5a, and is decompressed into medium-pressure saturated liquid refrigerant. The medium-pressure saturated liquid refrigerant flows into the receiver 11. The medium-pressure liquid refrigerant flowing out of the receiver 11 is branched into two streams. One of the two streams passes through the auxiliary heat exchanger 4b, and then flows into the second expansion valve 5b. Then, the stream of the liquid refrigerant is decompressed and expanded into two-phase gas-liquid refrigerant. The two-phase gas-liquid refrigerant flowing out of the second expansion valve 5b flows into the evaporator 6, and evaporates by cooling air being a heat exchange medium to turn into low-temperature and low-pressure gas refrigerant. The low-temperature and low-pressure gas refrigerant flowing out of the evaporator 6 is sucked into the compressor 1 again. The other stream of the branched medium-pressure liquid refrigerant flowing out of the receiver 11 flows into the auxiliary expansion valve 7, and is decompressed and expanded into two-phase refrigerant. The two-phase refrigerant passes through the auxiliary heat exchanger 4b, and is then injected into the compression chamber of the compressor 1.

Herein, in the auxiliary heat exchanger 4b, heat is exchanged between the liquid refrigerant flowing out of the receiver 11 and the two-phase refrigerant obtained after branching and being decompressed. Therefore, the refrigerant to be caused to flow into the expansion valve 5 is cooled into a subcooled state. Also, surplus refrigerant generated in the refrigeration cycle is accumulated in the receiver 11 as medium-pressure liquid refrigerant.

As described above, the refrigeration cycle apparatus 100 according to Embodiment 6 is configured such that the saturated liquid refrigerant flowing out of the receiver 11 is cooled by the auxiliary heat exchanger 4a. Therefore, it is possible to cause the liquid refrigerant in the subcooled state to flow into the second expansion valve 5b even when pressure loss occurs in the pipe, thereby being capable of preventing pressure pulsation of the high-pressure liquid refrigerant or shock waves, which may be caused by the inflow of the two-phase refrigerant. Thus, it is possible to provide a refrigeration cycle apparatus 100 that suppresses the influence on the global environment, by suppressing the disproportionation reaction even when the HFO-1123 refrigerant is used. Further, it is possible to provide a refrigeration cycle apparatus 100 that operates safely and suppresses the influence on the global environment, by enabling, even when surplus refrigerant is generated due to change in the operation state, accumulation of the surplus refrigerant in the receiver 11 under a state in which the disproportionation reaction is suppressed.

Figure 21:
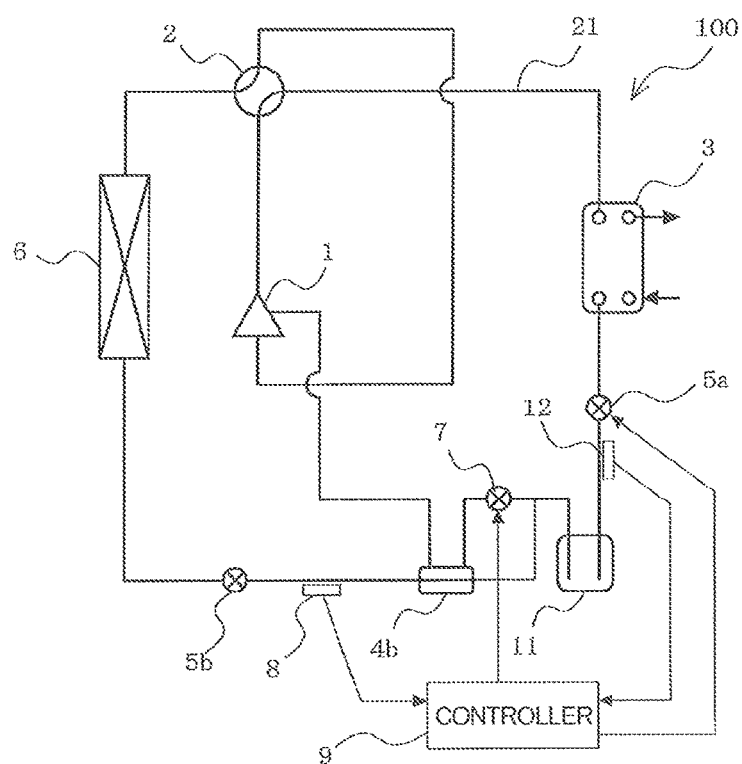
FIG. 21 is a system configuration diagram of the refrigeration cycle apparatus 100 according to Embodiment 6 of the present invention.
Figure 22:
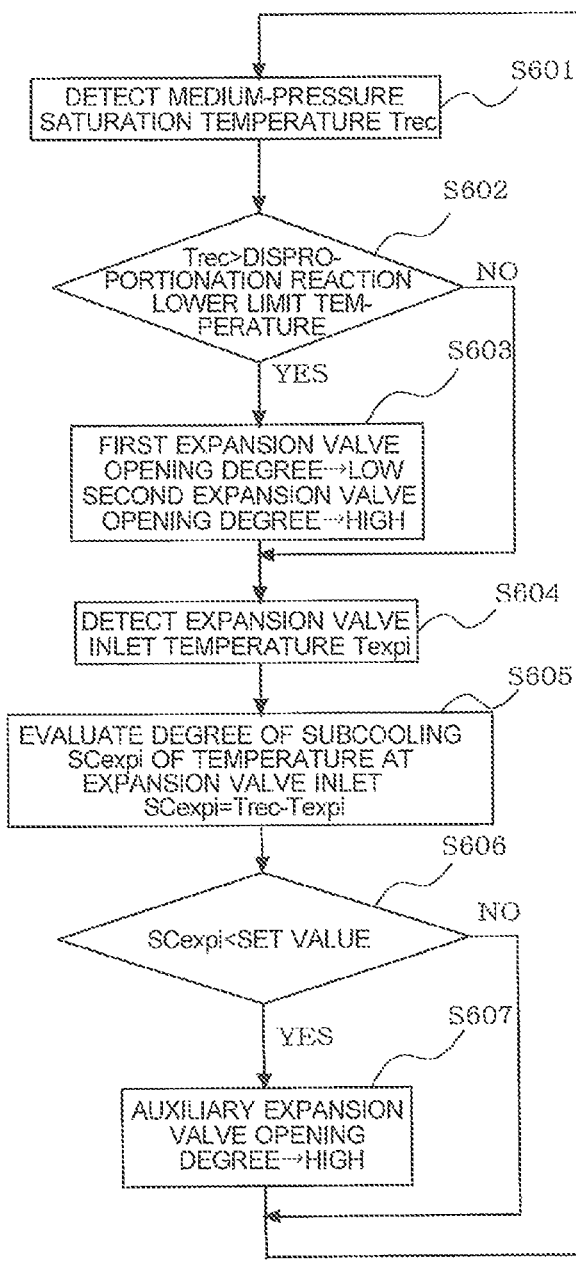
FIG. 22 is a flowchart of a procedure of controlling the first expansion valve 5a, the second expansion valve 5b, and the auxiliary expansion valve 7 of the refrigeration cycle apparatus 100 of FIG. 21.

FIG. 21 is a system configuration diagram of a refrigeration cycle apparatus 100 according to Embodiment 6 of the present invention. FIG. 21 is an illustration of a state of carrying out a heating operation for increasing the temperature of water on the load side. FIG. 22 is a flowchart of a procedure of controlling the first expansion valve 5a, the second expansion valve 5b, and the auxiliary expansion valve 7 of the refrigeration cycle apparatus 100 of FIG. 21.

As illustrated in FIG. 21, the refrigeration cycle apparatus 100 according to Embodiment 6 includes the receiver inlet temperature sensor 12, the expansion valve inlet temperature sensor 8, and the controller 9.

Next, an operation of the control to be carried out in the refrigeration cycle apparatus 100 according to this embodiment is described with reference to FIG. 21 and FIG. 22.

In Step S601, the medium-pressure saturation temperature Trec of the refrigeration cycle, which is detected by the receiver inlet temperature sensor 12, is input to the controller 9, and then the operation proceeds to Step S602.

In Step S602, the controller 9 compares the medium-pressure saturation temperature Trec detected by the receiver inlet temperature sensor 12 and the lower limit temperature of the disproportionation reaction.

When it is determined in Step S602 that the medium-pressure saturation temperature Trec detected by the receiver inlet temperature sensor 12 is higher than the lower limit temperature of the disproportionation reaction (YES in Step S602), the operation proceeds to Step S603.

When it is determined in Step S602 that the medium-pressure saturation temperature Trec detected by the receiver inlet temperature sensor 12 is equal to or lower than the lower limit temperature of the disproportionation reaction (NO in Step S602), the operation proceeds to Step S604.

In Step S603, the controller 9 outputs a control signal for reducing the opening degree of the first expansion valve 5a and increasing the opening degree of the second expansion valve 5b so that the medium-pressure saturation temperature Trec detected by the receiver inlet temperature sensor 12 becomes equal to or lower than the lower limit temperature of the disproportionation reaction. Then, the operation proceeds to Step S704.

In Step S604, the expansion valve inlet temperature Texpi detected by the expansion valve inlet temperature sensor 8 is input to the controller 9, and then the operation proceeds to Step S605. In Step S605, the controller 9 evaluates the degree of subcooling SCexpi at the inlet of the expansion valve by computing the difference between the medium-pressure saturation temperature Trec and the expansion valve inlet temperature Texpi. Then, the operation proceeds to Step S606. In Step S606, the controller 9 compares the degree of subcooling SCexpi at the inlet of the expansion valve and a set value that is set in advance.

When the controller 9 determines in Step S606 that the degree of subcooling SCexpi at the inlet of the expansion valve is lower than the set value that is set in advance (YES in Step S606), the operation proceeds to Step S607.

When the controller 9 determines in Step S606 that the degree of subcooling SCexpi at the inlet of the expansion valve is equal to or higher than the set value that is set in advance (NO in Step S606), the operation returns to Step S601.

In Step S607, the controller 9 outputs a control signal for increasing the opening degree of the auxiliary expansion valve 7, and then the operation returns to Step S601.

As described above, the refrigeration cycle apparatus 100 according to Embodiment 6 is configured to control the opening degree of the first expansion valve 5a and the opening degree of the second expansion valve 5b so that the medium-pressure saturation temperature Trec in the receiver 11 becomes equal to or lower than the lower limit temperature of the disproportionation reaction. Therefore, even when the HFO-1123 refrigerant is used and surplus refrigerant is generated due to change in the operation state, the surplus refrigerant can be accumulated in the receiver under a state in which the disproportionation reaction is suppressed. Thus, it is possible to provide the refrigeration cycle apparatus 100 that operates safely and suppresses the influence on the global environment. Further, the refrigeration cycle apparatus 100 according to Embodiment 6 is configured to control the opening degree of the auxiliary expansion valve 7 so that the degree of subcooling of the refrigerant to be caused to flow into the second expansion valve 5b is secured. Therefore, it is possible to prevent pressure pulsation of the high-pressure liquid refrigerant or shock waves, which may be caused by the inflow of the two-phase refrigerant. Thus, it is possible to provide the refrigeration cycle apparatus 100 that operates safely and suppresses the influence on the global environment, by suppressing the disproportionation reaction even when the HFO-1123 refrigerant is used.

Embodiment 7

Figure 23:
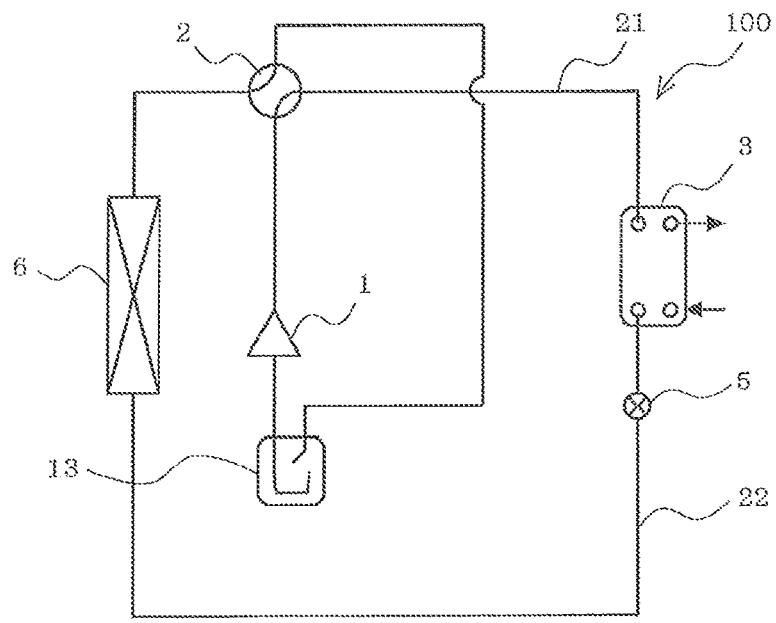
FIG. 23 is a refrigerant circuit diagram of a refrigeration cycle apparatus 100 according to Embodiment 7 of the present invention.

FIG. 23 is a refrigerant circuit diagram of a refrigeration cycle apparatus 100 according to Embodiment 7 of the present invention. FIG. 23 is an illustration of a state of carrying out a heating operation for increasing the temperature of water on a load side. In Embodiment 7, the same constituent elements as those of Embodiments 1 to 6 are represented by the same reference symbols. Also in Embodiment 7, the refrigerant including the HFO-1123 refrigerant is used as in Embodiments 1 to 6.

As illustrated in FIG. 23, the refrigeration cycle apparatus 100 according to Embodiment 7 includes the compressor 1, the four-way valve 2, the condenser 3, the expansion valve 5, the evaporator 6, and an accumulator 13 connected in a loop. The accumulator 13 is a container configured to accumulate, in a state of low-pressure liquid refrigerant, surplus refrigerant that may be generated depending on the operation state of the refrigeration cycle apparatus 100.

Next, an operation of a refrigeration cycle of the refrigeration cycle apparatus 100 according to Embodiment 7 is described with reference to FIG. 23.

Refrigerant in a low-temperature and low-pressure gas state is sucked into the compressor 1 and compressed into high-temperature and high-pressure gas, and the high-temperature and high-pressure gas is discharged from the compressor 1. The high-temperature and high-pressure refrigerant discharged from the compressor 1 flows into the condenser 3 via the four-way valve 2. The high-temperature and high-pressure gas refrigerant flowing into the condenser 3 rejects heat to water being a heat exchange medium to turn into liquid refrigerant. The liquid refrigerant flowing out of the condenser 3 flows into the expansion valve 5, and is decompressed and expanded into two-phase gas-liquid refrigerant. The two-phase gas-liquid refrigerant flowing out of the expansion valve 5 flows into the evaporator 6, and evaporates by cooling air being a heat exchange medium to turn into low-pressure two-phase refrigerant having high quality or low-pressure gas refrigerant. The low-pressure refrigerant flowing out of the evaporator 6 is sucked into the compressor 1 again via the accumulator 13. Surplus refrigerant generated in the refrigeration cycle is accumulated in the accumulator 13 as low-pressure liquid refrigerant.

As described above, the refrigeration cycle apparatus 100 according to Embodiment 7 is configured such that surplus refrigerant generated in the refrigeration cycle is decompressed to have low pressure and accumulated in the accumulator 13. Therefore, the disproportionation reaction is suppressed even when the HFO-1123 refrigerant is used. Thus, it is possible to provide a refrigeration cycle apparatus 100 that operates safely and suppresses the influence on the global environment.

Embodiment 8

Figure 24:
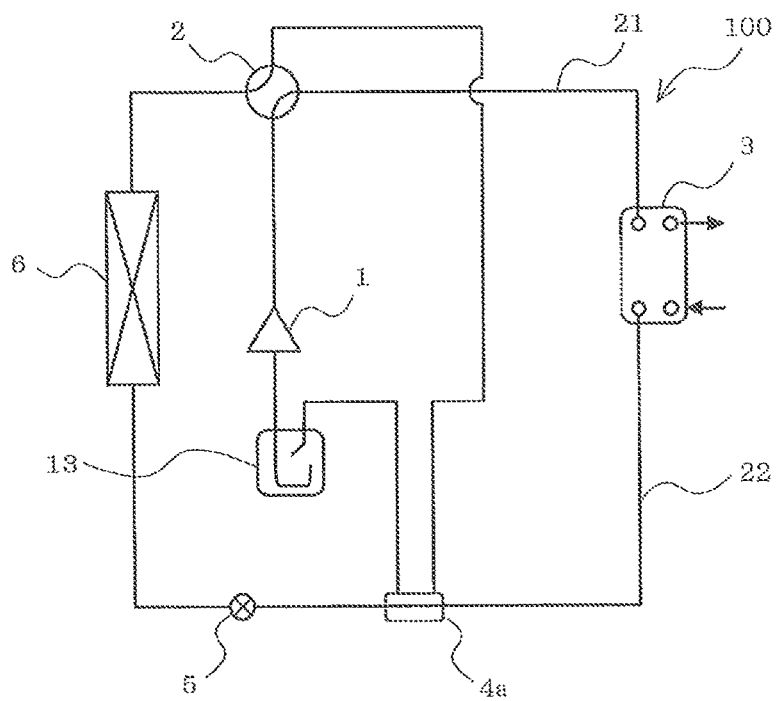
FIG. 24 is a refrigerant circuit diagram of a refrigeration cycle apparatus 100 according to Embodiment 8 of the present invention.

FIG. 24 is a refrigerant circuit diagram of a refrigeration cycle apparatus 100 according to Embodiment 8 of the present invention. FIG. 24 is an illustration of a state of carrying out a heating operation for increasing the temperature of water on a load side. In Embodiment 8, the same constituent elements as those of Embodiments 1 and 7 are represented by the same reference symbols. Also in Embodiment 8, the refrigerant including the HFO-1123 refrigerant is used as in Embodiments 1 to 7.

As illustrated in FIG. 24, the refrigeration cycle apparatus 100 according to Embodiment 8 includes the compressor 1, the four-way valve 2, the condenser 3, the expansion valve 5, the evaporator 6, and the accumulator 13 connected in a loop, and the auxiliary heat exchanger 4a configured to exchange heat between the refrigerant flowing from the condenser 3 toward the expansion valve 5 and the low-pressure refrigerant flowing from the evaporator 6 toward the compressor 1.

Next, an operation of a refrigeration cycle of the refrigeration cycle apparatus 100 according to Embodiment 8 is described with reference to FIG. 24.

Refrigerant in a low-temperature and low-pressure gas state is sucked into the compressor 1 and compressed into high-temperature and high-pressure gas, and the high-temperature and high-pressure gas is discharged from the compressor 1. The high-temperature and high-pressure refrigerant discharged from the compressor 1 flows into the condenser 3 via the four-way valve 2. The high-temperature and high-pressure gas refrigerant flowing into the condenser 3 rejects heat to water being a heat exchange medium to turn into liquid refrigerant. The liquid refrigerant flowing out of the condenser 3 passes through the auxiliary heat exchanger 4a. Then, the refrigerant flows into the expansion valve 5, and is decompressed into two-phase gas-liquid refrigerant. The two-phase gas-liquid refrigerant flowing out of the expansion valve 5 flows into the evaporator 6, and evaporates by cooling air being a heat exchange medium to turn into low-pressure two-phase refrigerant having high quality or low-pressure gas refrigerant. The low-pressure refrigerant flowing out of the evaporator 6 is sucked into the compressor 1 again via the accumulator 13.

In the auxiliary heat exchanger 4a, heat is exchanged between the liquid refrigerant flowing out of the condenser 3 and the refrigerant flowing out of the evaporator 6. Therefore, the liquid refrigerant flowing out of the condenser 3 is cooled into a subcooled state, and then flows into the expansion valve 5. Surplus refrigerant generated in the refrigeration cycle is accumulated in the accumulator 13 as low-pressure liquid refrigerant.

As described above, the refrigeration cycle apparatus 100 according to Embodiment 8 is configured such that the liquid refrigerant flowing out of the condenser 3 is cooled by the auxiliary heat exchanger 4a. Therefore, it is possible to cause the liquid refrigerant in the subcooled state to securely flow into the expansion valve 5 even when pressure loss occurs in the pipe, thereby being capable of preventing pressure pulsation of the high-pressure liquid refrigerant or shock waves, which may be caused by the inflow of the two-phase refrigerant. Therefore, the disproportionation reaction is suppressed even when the HFO-1123 refrigerant is used. Thus, it is possible to provide a refrigeration cycle apparatus 100 that operates safely and suppresses the influence on the global environment. Further, surplus refrigerant generated in the refrigeration cycle is decompressed to have low pressure and accumulated in the accumulator 13. Therefore, the disproportionation reaction is suppressed even when the HFO-1123 refrigerant is used. Thus, it is possible to provide the refrigeration cycle apparatus 100 that operates safely and suppresses the influence on the global environment.

Embodiment 9

Figure 25:
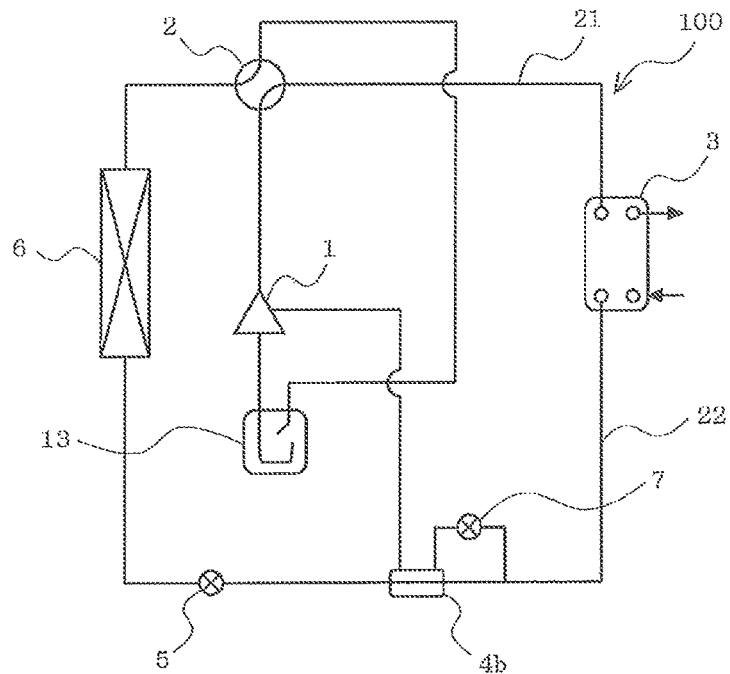
FIG. 25 is a refrigerant circuit diagram of a refrigeration cycle apparatus 100 according to Embodiment 9 of the present invention.

FIG. 25 is a refrigerant circuit diagram of a refrigeration cycle apparatus 100 according to Embodiment 9 of the present invention. FIG. 25 is an illustration of a state of carrying out a heating operation for increasing the temperature of water on a load side. In Embodiment 9, the same constituent elements as those of Embodiments 1 to 8 are represented by the same reference symbols. Also in Embodiment 9, the refrigerant including the HFO-1123 refrigerant is used as in Embodiments 1 to 8.

As illustrated in FIG. 25, the refrigeration cycle apparatus 100 according to Embodiment 9 includes the compressor 1, the four-way valve 2, the condenser 3, the auxiliary heat exchanger 4b, the expansion valve 5, the evaporator 6, and the accumulator 13 connected in a loop. The refrigeration cycle apparatus 100 according to Embodiment 9 is configured such that the auxiliary heat exchanger 4b exchanges heat between the refrigerant at the outlet side of the condenser 3 and a part of the refrigerant, which is branched at the outlet side of the condenser 3 and decompressed by the auxiliary expansion valve 7, and that the refrigerant obtained after the decompression by the auxiliary expansion valve 7 and the heat exchange by the auxiliary heat exchanger 4b is injected into the compression chamber of the compressor 1.

Next, an operation of a refrigeration cycle of the refrigeration cycle apparatus 100 according to Embodiment 9 is described with reference to FIG. 25.

Refrigerant in a low-temperature and low-pressure gas state is sucked into the compressor 1 and compressed into high-temperature and high-pressure gas, and the high-temperature and high-pressure gas is discharged from the compressor 1. The high-temperature and high-pressure refrigerant discharged from the compressor 1 flows into the condenser 3 via the four-way valve 2. The high-temperature and high-pressure gas refrigerant flowing into the condenser 3 rejects heat to water being a heat exchange medium to turn into liquid refrigerant. The liquid refrigerant flowing out of the condenser 3 is branched into two streams. One of the two streams passes through the auxiliary heat exchanger 4b, and then flows into the expansion valve 5. Then, the stream of the liquid refrigerant is decompressed and expanded into two-phase gas-liquid refrigerant. The two-phase gas-liquid refrigerant flowing out of the expansion valve 5 flows into the evaporator 6, and evaporates by cooling air being a heat exchange medium to turn into low-temperature and low-pressure gas refrigerant. The low-temperature and low-pressure gas refrigerant flowing out of the evaporator 6 is sucked into the compressor 1 again via the accumulator 13. The other stream of the liquid refrigerant branched after flowing out of the condenser 3 flows into the auxiliary expansion valve 7, and is decompressed and expanded into low-pressure two-phase refrigerant. The low-pressure two-phase refrigerant passes through the auxiliary heat exchanger 4b, and is then injected into the compression chamber of the compressor 1.

Herein, in the auxiliary heat exchanger 4b, heat is exchanged between the liquid refrigerant flowing out of the condenser 3 and the two-phase refrigerant obtained after branching and being decompressed. Therefore, the refrigerant to be caused to flow into the expansion valve 5 is cooled into a subcooled state. Also, surplus refrigerant generated in the refrigeration cycle is accumulated in the accumulator 13 as low-pressure liquid refrigerant.

As described above, the refrigeration cycle apparatus 100 according to Embodiment 9 is configured such that the liquid refrigerant flowing out of the condenser 3 is cooled by the auxiliary heat exchanger 4b. Therefore, it is possible to cause the liquid refrigerant in the subcooled state to flow into the expansion valve 5 even when pressure loss occurs in the pipe, thereby being capable of preventing pressure pulsation of the high-pressure liquid refrigerant or shock waves, which may be caused by the inflow of the two-phase refrigerant. Thus, it is possible to provide a refrigeration cycle apparatus 100 that operates safely and suppresses the influence on the global environment, by suppressing the disproportionation reaction even when the HFO-1123 refrigerant is used. Further, it is possible to provide a refrigeration cycle apparatus 100 that operates safely and suppresses the influence on the global environment, by enabling, even when surplus refrigerant is generated due to change in the operation state, accumulation of the surplus refrigerant in the accumulator under a state in which the disproportionation reaction is suppressed.

Figure 26:
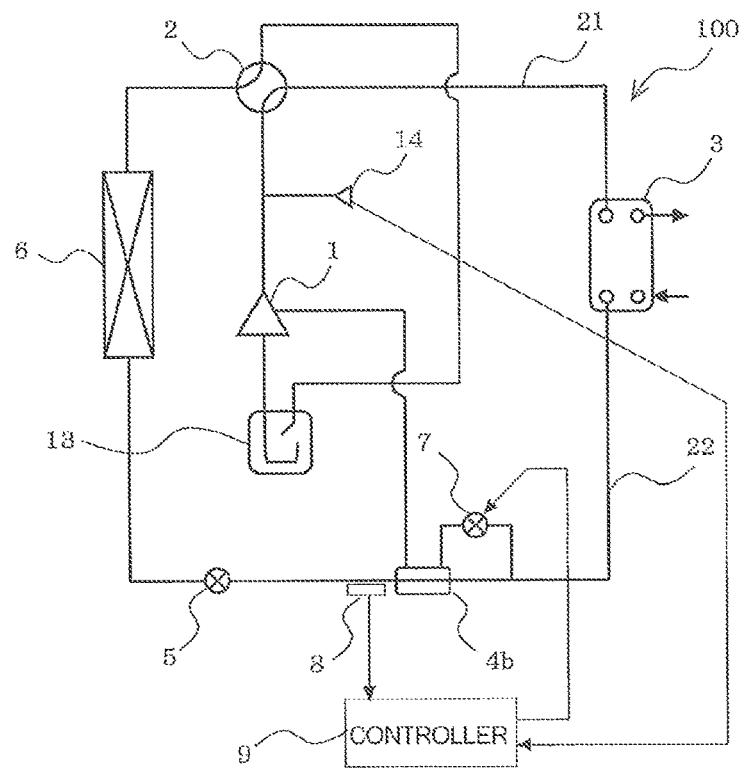
FIG. 26 is a system configuration diagram of the refrigeration cycle apparatus 100 according to Embodiment 9 of the present invention.

FIG. 26 is a system configuration diagram of the refrigeration cycle apparatus 100 according to Embodiment 9 of the present invention. FIG. 26 is an illustration of the state of carrying out the heating operation for increasing the temperature of the water on the load side. In FIG. 26, the same constituent elements as those of FIG. 9 are represented by the same reference symbols.

As illustrated in FIG. 26, the refrigeration cycle apparatus 100 according to Embodiment 9 includes the expansion valve inlet temperature sensor 8, the high-pressure sensor 14, and the controller 9. A flowchart of a procedure of controlling the auxiliary expansion valve 7 of the refrigeration cycle apparatus 100 of FIG. 26 is similar to that of FIG. 10, and description thereof is therefore omitted herein.

As described above, the refrigeration cycle apparatus 100 according to Embodiment 9 is configured such that the degree of subcooling SCexpi at the inlet of the expansion valve is secured to have a value equal to or higher than the set value, and then the liquid refrigerant is caused to flow into the expansion valve 5 under the subcooled state. Therefore, it is possible to prevent pressure pulsation of the high-pressure liquid refrigerant or shock waves, which may be caused by the inflow of the two-phase refrigerant into the expansion valve 5. Thus, it is possible to provide the refrigeration cycle apparatus 100 that operates safely and suppresses the influence on the global environment, by suppressing the disproportionation reaction even when the HFO-1123 refrigerant is used. Further, it is possible to provide the refrigeration cycle apparatus 100 that operates safely and suppresses the influence on the global environment, by enabling, even when surplus refrigerant is generated due to change in the operation state, accumulation of the surplus refrigerant in the accumulator 13 under a state of low-pressure liquid refrigerant that is suppressed in the disproportionation reaction.

Embodiment 10

Figure 27:
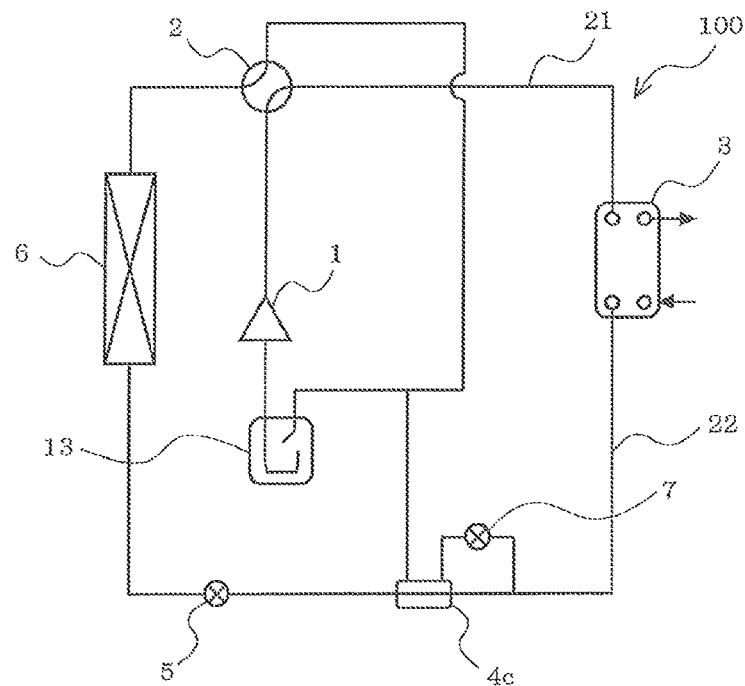
FIG. 27 is a refrigerant circuit diagram of a refrigeration cycle apparatus 100 according to Embodiment 10 of the present invention.

FIG. 27 is a refrigerant circuit diagram of a refrigeration cycle apparatus 100 according to Embodiment 10 of the present invention. FIG. 27 is an illustration of a state of carrying out a heating operation for increasing the temperature of water on a load side. In Embodiment 10, the same constituent elements as those of Embodiments 3 and 7 are represented by the same reference symbols. Also in Embodiment 10, the refrigerant including the HFO-1123 refrigerant is used as in Embodiments 1 to 9.

As illustrated in FIG. 27, the refrigeration cycle apparatus 100 according to Embodiment 10 includes the compressor 1, the four-way valve 2, the condenser 3, the expansion valve 5, the evaporator 6, and the accumulator 13 connected in a loop, and the auxiliary heat exchanger 4c configured to exchange heat between the refrigerant at the outlet side of the condenser 3 and a part of the refrigerant, which is branched at the outlet side of the condenser 3 and decompressed by the auxiliary expansion valve 7. The refrigeration cycle apparatus 100 according to Embodiment 10 is configured such that the low-temperature and low-pressure refrigerant obtained after the decompression by the auxiliary expansion valve 7 and the heat exchange by the auxiliary heat exchanger 4c is caused to join the refrigerant on the suction side of the compressor 1.

Next, an operation of a refrigeration cycle of the refrigeration cycle apparatus 100 according to this embodiment is described with reference to FIG. 27.

Refrigerant in a low-temperature and low-pressure gas state is sucked into the compressor 1 and compressed into high-temperature and high-pressure gas, and the high-temperature and high-pressure gas is discharged from the compressor 1. The high-temperature and high-pressure refrigerant discharged from the compressor 1 flows into the condenser 3 via the four-way valve 2. The high-temperature and high-pressure gas refrigerant flowing into the condenser 3 rejects heat to water being a heat exchange medium to turn into liquid refrigerant. The liquid refrigerant flowing out of the condenser 3 is branched into two streams. One of the two streams passes through the auxiliary heat exchanger 4c, and then flows into the expansion valve 5. Then, the stream of the liquid refrigerant is decompressed and expanded into two-phase gas-liquid refrigerant. The two-phase gas-liquid refrigerant flowing out of the expansion valve 5 flows into the evaporator 6, and evaporates by cooling air being a heat exchange medium to turn into low-temperature and low-pressure gas refrigerant. The low-temperature and low-pressure gas refrigerant flowing out of the evaporator 6 is sucked into the compressor 1 again via the accumulator 13. The other stream of the branched liquid refrigerant flows into the auxiliary expansion valve 7, and is decompressed and expanded into two-phase refrigerant. The two-phase refrigerant passes through the auxiliary heat exchanger 4c, and is then caused to join the refrigerant on the suction side of the compressor 1.

Herein, in the auxiliary heat exchanger 4c, heat is exchanged between the liquid refrigerant flowing out of the condenser 3 and the two-phase refrigerant obtained after branching and being decompressed. Therefore, the liquid refrigerant to be caused to flow into the expansion valve 5 is cooled into a subcooled state. Also, surplus refrigerant generated in the refrigeration cycle is accumulated in the accumulator 13 as low-pressure liquid refrigerant.

As described above, the refrigeration cycle apparatus 100 according to Embodiment 10 is configured such that the liquid refrigerant to be caused to flow into the expansion valve 5 is cooled and caused to flow into the expansion valve 5 under the subcooled state. Therefore, it is possible to prevent pressure pulsation of the high-pressure liquid refrigerant or shock waves, which may be caused by the inflow of the two-phase refrigerant into the expansion valve 5. Thus, it is possible to provide a refrigeration cycle apparatus 100 that operates safely and suppresses the influence on the global environment, by suppressing the disproportionation reaction even when the HFO-1123 refrigerant is used. Further, it is possible to provide a refrigeration cycle apparatus 100 that operates safely and suppresses the influence on the global environment, by enabling, even when surplus refrigerant is generated due to change in the operation state, accumulation of the surplus refrigerant in the accumulator 13 under a state of low-pressure liquid refrigerant that is suppressed in the disproportionation reaction.

Figure 28:
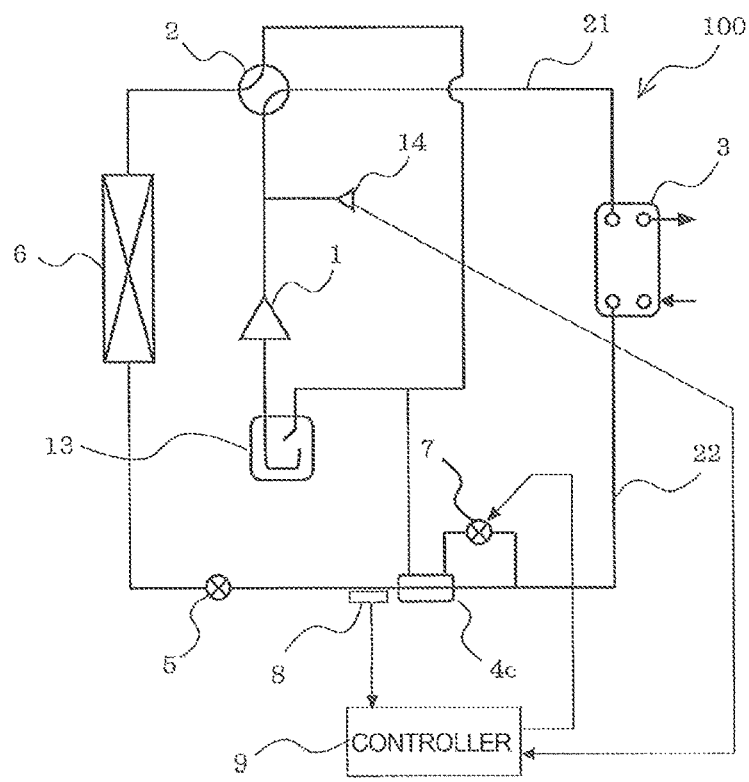
FIG. 28 is a system configuration diagram of the refrigeration cycle apparatus 100 according to Embodiment 10 of the present invention.

FIG. 28 is a system configuration diagram of the refrigeration cycle apparatus 100 according to Embodiment 10 of the present invention. FIG. 28 is an illustration of the state of carrying out the heating operation for increasing the temperature of the water on the load side. In FIG. 28, the same constituent elements as those of FIG. 9 are represented by the same reference symbols.

As illustrated in FIG. 28, the refrigeration cycle apparatus 100 according to Embodiment 10 includes the expansion valve inlet temperature sensor 8, the high-pressure sensor 14, and the controller 9. A flowchart of a procedure of control to be carried out in the refrigeration cycle apparatus 100 of FIG. 28 is similar to that of FIG. 10, and description thereof is therefore omitted herein.

As described above, the refrigeration cycle apparatus 100 according to Embodiment 10 is configured such that the degree of subcooling SCexpi at the inlet of the expansion valve is secured to have a value equal to or higher than the set value, and then the liquid refrigerant is caused to flow into the expansion valve 5 under the subcooled state. Therefore, it is possible to prevent pressure pulsation of the high-pressure liquid refrigerant or shock waves, which may be caused by the inflow of the two-phase refrigerant into the expansion valve 5. Thus, it is possible to provide the refrigeration cycle apparatus 100 that operates safely and suppresses the influence on the global environment, by suppressing the disproportionation reaction even when the HFO-1123 refrigerant is used. Further, it is possible to provide the refrigeration cycle apparatus 100 that operates safely and suppresses the influence on the global environment, by enabling, even when surplus refrigerant is generated due to change in the operation state, accumulation of the surplus refrigerant in the accumulator 13 under a state of low-pressure liquid refrigerant that is suppressed in the disproportionation reaction.

Embodiment 11

Figure 29:
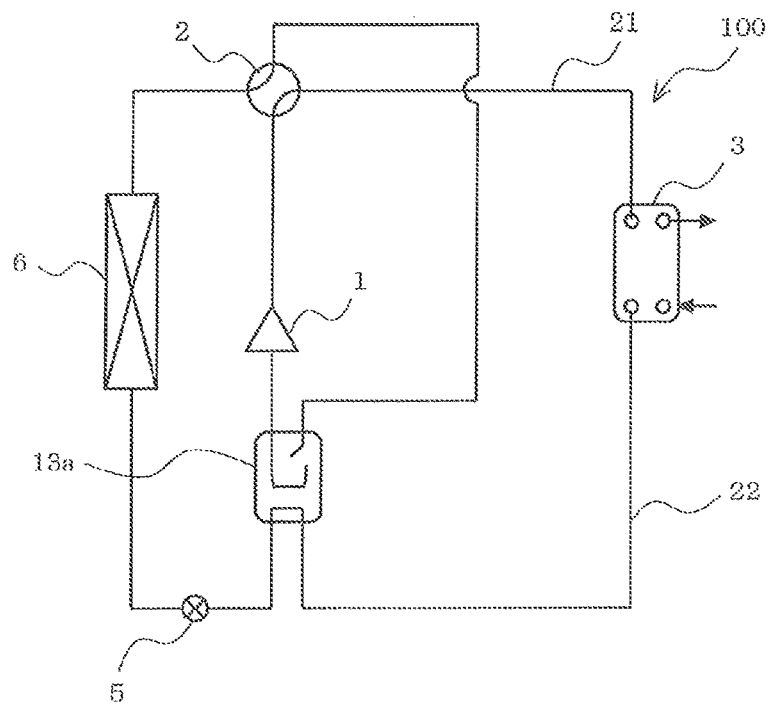
FIG. 29 is a refrigerant circuit diagram of a refrigeration cycle apparatus 100 according to Embodiment 11 of the present invention.

FIG. 29 is a refrigerant circuit diagram of a refrigeration cycle apparatus 100 according to Embodiment 11 of the present invention. FIG. 29 is an illustration of a state of carrying out a heating operation for increasing the temperature of water on a load side. Also in Embodiment 11, the refrigerant including the HFO-1123 refrigerant is used as in Embodiments 1 to 10.

As illustrated in FIG. 29, the refrigeration cycle apparatus 100 according to Embodiment 11 includes the compressor 1, the four-way valve 2, the condenser 3, the expansion valve 5, the evaporator 6, and an accumulator 13a connected in a loop. Also, a part of the pipe extending from the outlet side of the condenser 3 to the inlet side of the expansion valve 5 is inserted into the accumulator 13a.

The accumulator 13a is a container configured to accumulate, in a state of low-pressure liquid refrigerant, surplus refrigerant that may be generated depending on the operation state of the refrigeration cycle apparatus 100. Further, the part of the pipe extending from the condenser 3 to the expansion valve 5 is inserted into the accumulator 13a. Still further, the accumulator 13a has a function of exchanging heat between the refrigerant at the outlet side of the condenser 3 and the low-temperature and low-pressure refrigerant in the accumulator 13a. The other constituent elements that are the same as those of Embodiment 1 are represented by the same reference symbols.

Next, an operation of a refrigeration cycle of the refrigeration cycle apparatus 100 according to Embodiment 11 is described with reference to FIG. 29.

Refrigerant in a low-temperature and low-pressure gas state is sucked into the compressor 1 and compressed into high-temperature and high-pressure gas, and the high-temperature and high-pressure gas is discharged from the compressor 1. The high-temperature and high-pressure refrigerant discharged from the compressor 1 flows into the condenser 3 via the four-way valve 2. The high-temperature and high-pressure gas refrigerant flowing into the condenser 3 rejects heat to water being a heat exchange medium to turn into liquid refrigerant. The liquid refrigerant flowing out of the condenser 3 passes through the pipe in the accumulator 13a. Then, the refrigerant flows into the expansion valve 5, and is decompressed and expanded into two-phase gas-liquid refrigerant. The two-phase gas-liquid refrigerant flowing out of the expansion valve 5 flows into the evaporator 6, and evaporates by cooling air being a heat exchange medium to turn into low-temperature and low-pressure gas refrigerant. The low-temperature and low-pressure gas refrigerant flowing out of the evaporator 6 is sucked into the compressor 1 again via the accumulator 13a.

Herein, the part of the pipe extending from the condenser 3 to the expansion valve 5 is inserted into the accumulator 13a so that heat is exchanged between the refrigerant at the outlet side of the condenser 3 and the low-temperature and low-pressure refrigerant in the accumulator 13. Therefore, the liquid refrigerant to be caused to flow into the expansion valve 5 is cooled into a subcooled state. Also, surplus refrigerant generated in the refrigeration cycle is accumulated in the accumulator 13 as low-pressure liquid refrigerant.

As described above, the refrigeration cycle apparatus 100 according to Embodiment 11 is configured such that the liquid refrigerant to be caused to flow into the expansion valve 5 is cooled and caused to flow into the expansion valve 5 under the subcooled state. Therefore, it is possible to prevent pressure pulsation of the liquid refrigerant or shock waves, which may be caused by the inflow of the two-phase refrigerant into the expansion valve 5. Thus, it is possible to provide a refrigeration cycle apparatus 100 that operates safely and suppresses the influence on the global environment, by suppressing the disproportionation reaction even when the HFO-1123 refrigerant is used. Further, it is possible to provide a refrigeration cycle apparatus 100 that operates safely and suppresses the influence on the global environment, by enabling, even when surplus refrigerant is generated due to change in the operation state, accumulation of the surplus refrigerant in the accumulator 13 under a state of low-pressure liquid refrigerant that is suppressed in the disproportionation reaction.

The description is given of the example in which the heat exchange medium is water or air, but brine may be used instead.

The receiver inlet temperature sensor 12 corresponds to a first detection unit of the present invention.

The receiver inlet pressure sensor 15 corresponds to a second detection unit of the present invention.

The high-pressure sensor 14 corresponds to a third detection unit of the present invention.

The expansion valve inlet temperature sensor 8 corresponds to a fourth detection unit of the present invention.

The discharge temperature sensor 10 corresponds to a fifth detection unit of the present invention.

Each of the auxiliary heat exchangers 4a, 4b, and 4c and the accumulator 13a corresponds to a cooling unit of the present invention.

REFERENCE SIGNS LIST 1 compressor
2 four-way valve 3 condenser
4a, 4b, 4c auxiliary heat exchanger
5 expansion valve
5a first expansion valve
5b second expansion valve
6 evaporator
7 auxiliary expansion valve
8 expansion valve inlet temperature sensor
9 controller
10 discharge temperature sensor receiver
12 receiver inlet temperature sensor
13, 13a accumulator high-pressure sensor
15 receiver inlet pressure sensor
21 high-pressure gas pipe
22 high-pressure liquid pipe
100 refrigeration cycle apparatus
Pd high pressure
Prec receiver inlet pressure
Td discharge temperature
Trec medium-pressure saturation temperature

The invention claimed is:

1. A refrigeration cycle apparatus using refrigerant including HFO-1123, the refrigeration cycle apparatus comprising:
a compressor, a condenser, an expansion valve, and an evaporator connected in a loop;
a cooling unit configured to cool the refrigerant at an inlet of the expansion valve, the cooling unit cooling the refrigerant including HFO-1123 so that a temperature and a pressure of the refrigerant becomes equal to or less than a lower limit temperature or a lower limit pressure causing disproportionation reaction;
a first refrigerant pipe connected between an outlet of the condenser and the expansion valve, one end of the first refrigerant pipe being connected to the outlet of the condenser and another end of the first refrigerant pipe being connected to the expansion valve; and
a second refrigerant pipe connected between the compressor and an inlet of the condenser, one end of the second refrigerant pipe being connected to the compressor and another end of the second refrigerant pipe being connected to the inlet of the condenser;
wherein the first refrigerant pipe has a diameter that is smaller than a diameter of the second refrigerant pipe.

2. The refrigeration cycle apparatus of claim 1, wherein the cooling unit comprises an auxiliary heat exchanger configured to exchange heat between a first stream of the refrigerant including HFO-1123 flowing out of the condenser and before being decompressed by the expansion valve and a second stream of the refrigerant including HFO-1123 to be sucked into the compressor.

3. The refrigeration cycle apparatus of claim 1,
wherein the cooling unit comprises an auxiliary heat exchanger configured to exchange heat between a first stream of the refrigerant including HFO-1123 at an outlet side of the condenser and a second stream of the refrigerant including HFO-1123, which is branched at the outlet side of the condenser and decompressed by an auxiliary expansion valve, and
wherein the second stream of the refrigerant including HFO-1123 decompressed by the auxiliary expansion valve and subjected to heat exchange by the auxiliary heat exchanger joins the refrigerant including HFO-1123 on a suction side of the compressor.

4. The refrigeration cycle apparatus of claim 1,
wherein the cooling unit comprises an accumulator provided on a suction side of the compressor, and
wherein a part of a pipe connecting an outlet side of the condenser and an inlet side of the expansion valve is inserted into the accumulator.

5. The refrigeration cycle apparatus of claim 1, further comprising a high-pressure sensor configured to detect a pressure of the refrigerant including HFO-1123 at an outlet side of the compressor, and
a controller configured to control a rotation speed of the compressor so that the pressure detected by the high-pressure sensor becomes equal to or less than the lower limit pressure causing disproportionation reaction.

6. The refrigeration cycle apparatus of claim 1, further comprising a discharge temperature sensor configured to detect a temperature at an outlet side of the compressor, and
a controller configured to control a rotation speed of the compressor so that the temperature detected by the discharge temperature sensor becomes equal to or less than the lower limit pressure causing disproportionation reaction.

7. The refrigeration cycle apparatus of claim 1,
wherein the condenser comprises a plate heat exchanger, and
wherein a heat exchange medium comprises water or brine.

8. The refrigeration cycle apparatus of claim 1, further comprising:
wherein the expansion valve is a first expansion valve,
a second expansion valve connected in the loop,
a receiver provided between the first expansion valve and the second expansion valve; and
at least one of a temperature sensor and a pressure sensor to detect a temperature or a pressure of the refrigerant including HFO-1123 in liquid form to be accumulated in the receiver,
wherein an opening degree of the first expansion valve or the second expansion valve is controlled so that the detected temperature by the temperature sensor or the detected pressure by the pressure sensor of the liquid refrigerant including HFO-1123 becomes equal to or less than the lower limit temperature or the lower limit pressure causing disproportionation reaction.

9. The refrigeration cycle apparatus of claim 1,
wherein the cooling unit comprises an auxiliary heat exchanger configured to exchange heat between a first stream of the refrigerant including HFO-1123 at an outlet side of the condenser and a second stream of the refrigerant including HFO-1123, which is branched at the outlet side of the condenser and decompressed by an auxiliary expansion valve, and
wherein the second stream of the refrigerant including HFO-1123 decompressed by the auxiliary expansion valve and subjected to heat exchange by the auxiliary heat exchanger is injected into a compression chamber of the compressor.

10. The refrigeration cycle apparatus of claim 9, further comprising an expansion valve inlet temperature sensor configured to detect a temperature of the refrigerant including HFO-1123 at an outlet side of the auxiliary heat exchanger, and
a controller configured to control an opening degree of the auxiliary expansion valve based on the temperature detected by the expansion valve inlet temperature sensor so that the temperature of the refrigerant becomes equal to or less than the lower limit temperature causing disproportionation reaction.

11. A refrigeration cycle using refrigerant including HFO-1123, the refrigeration cycle apparatus comprising:

a compressor, a condenser, an expansion valve, and an evaporator connected in a loop;

a cooling unit configured to cool the refrigerant including HFO-1123 at an inlet of the expansion valve so that the refrigerant including HFO-1123 at the inlet of the expansion valve has a temperature and pressure equal to or less than a lower limit temperature and a lower limit pressure causing disproportionation reaction, a high-pressure sensor configured to detect a pressure of the refrigerant including HFO-1123 at an outlet side of the compressor, an expansion valve inlet temperature sensor configured to detect a temperature of the refrigerant including HFO-1123 at an outlet side of the auxiliary heat exchanger, and a controller configured to:
  obtain a degree of subcooling of the refrigerant including HFO-1123 at the outlet side of the auxiliary heat exchanger based on the pressure detected by the high-pressure sensor and the temperature detected by the expansion valve inlet temperature sensor, and
  control an opening degree of the auxiliary expansion valve so that the degree of subcooling of the refrigerant including HFO-1123 at the outlet side of the auxiliary heat exchanger becomes equal to or higher than a set value that is set in advance, wherein the cooling unit comprises an auxiliary heat exchanger configured to exchange heat between a first stream of the refrigerant including HFO-1123 at an outlet side of the condenser and a second stream of the refrigerant including HFO-1123, which is branched at the outlet side of the condenser and decompressed by an auxiliary expansion valve, and wherein the second stream of the refrigerant including HFO-1123 decompressed by the auxiliary expansion valve and subjected to heat exchange by the auxiliary heat exchanger is injected into a compression chamber of the compressor.

* * * * *